(12) United States Patent
Hymas et al.

(10) Patent No.: US 11,775,630 B2
(45) Date of Patent: Oct. 3, 2023

(54) AUTHENTICATION OF DEVICES BY INDICATORS ON DEVICE PACKAGING

(71) Applicant: Hewlett-Packard Development Company, L.P., Spring, TX (US)

(72) Inventors: Scott K. Hymas, Boise, ID (US);
Gabriel S. McDaniel, Boise, ID (US);
Dennis A. Abramsohn, Boise, ID (US);
Christopher P. Murschel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 16/960,398

(22) PCT Filed: Jan. 12, 2018

(86) PCT No.: PCT/US2018/013459
§ 371 (c)(1),
(2) Date: Jul. 7, 2020

(87) PCT Pub. No.: WO2019/139605
PCT Pub. Date: Jul. 18, 2019

(65) Prior Publication Data
US 2020/0356658 A1    Nov. 12, 2020

(51) Int. Cl.
*G06F 21/44*    (2013.01)
*H04L 9/32*    (2006.01)

(52) U.S. Cl.
CPC .......... *G06F 21/445* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 2004/0017295 A1 | 1/2004 | Dishongh et al. | |
| 2006/0175226 A1 | 8/2006 | Abergel | |
| 2011/0115843 A1* | 5/2011 | Leykamm | B65C 9/46 |
| | | | 347/20 |
| 2011/0305465 A1 | 12/2011 | Mimura | |
| 2012/0134686 A1* | 5/2012 | Jones | G03G 21/1892 |
| | | | 399/12 |
| 2016/0210547 A1 | 7/2016 | Dekeyser et al. | |

(Continued)

FOREIGN PATENT DOCUMENTS

| | | |
|---|---|---|
| CN | 2262535 Y | 9/1997 |
| CN | 101145252 A | 3/2008 |

(Continued)

*Primary Examiner* — Jeffrey C Pwu
*Assistant Examiner* — Mayasa A. Shaawat
(74) *Attorney, Agent, or Firm* — Foley & Lardner LLP

(57) ABSTRACT

An example apparatus includes a packaging container, and any of a label and an electronic tag detachably connected to the packaging container and including an electrical code set for electrical authentication upon removal of any of the label and the electronic tag from the packaging container and being affixed to a device associated with the packaging container, wherein the electrical authentication is to validate the packaging container and the device as original equipment manufacturer components. Any of the label and the packaging container is altered upon removal of the label from the packaging container.

19 Claims, 21 Drawing Sheets

(56) References Cited

U.S. PATENT DOCUMENTS

2017/0134610 A1    5/2017  Stievenart et al.
2017/0297790 A1*  10/2017  Porte ...................... B65D 55/02
2020/0324930 A1*  10/2020  Hutter ..................... B65B 5/024

FOREIGN PATENT DOCUMENTS

| CN | 101246538 A * | 8/2008 | ............. G06F 21/79 |
| --- | --- | --- | --- |
| CN | 101490698 A | 7/2009 | |
| CN | 101516635 A | 8/2009 | |
| CN | 201503667 U | 6/2010 | |
| CN | 103124976 A | 5/2013 | |
| CN | 104680226 A | 6/2015 | |
| CN | 103875006 B * | 6/2017 | ......... G06K 7/10267 |
| EP | 2 453 398 A1 | 5/2012 | |
| EP | 3370386 B1 * | 5/2019 | ............... E02D 5/48 |
| JP | 2005-107113 A | 4/2005 | |
| WO | WO-2016115088 A1 * | 7/2016 | ......... G06K 19/0723 |

* cited by examiner

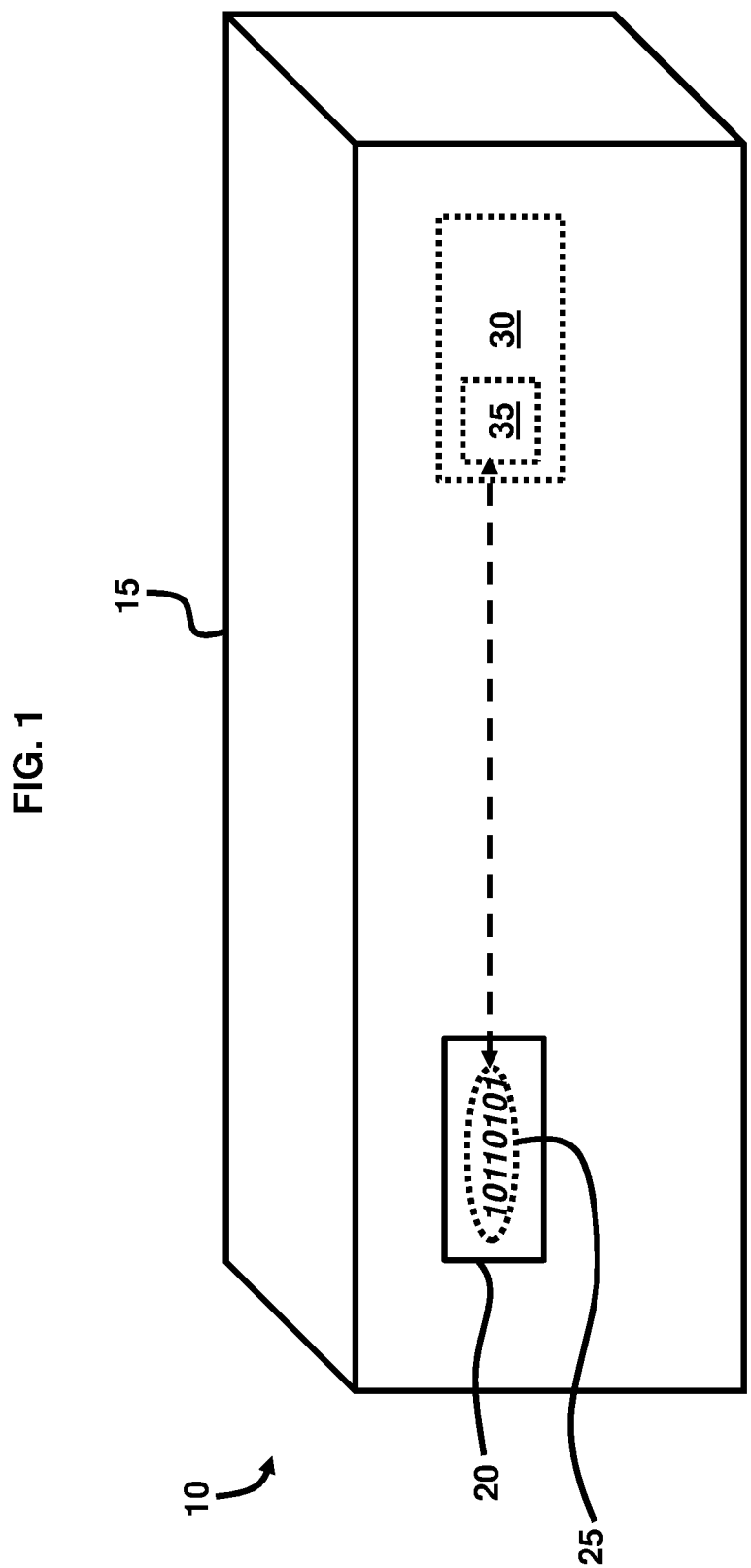

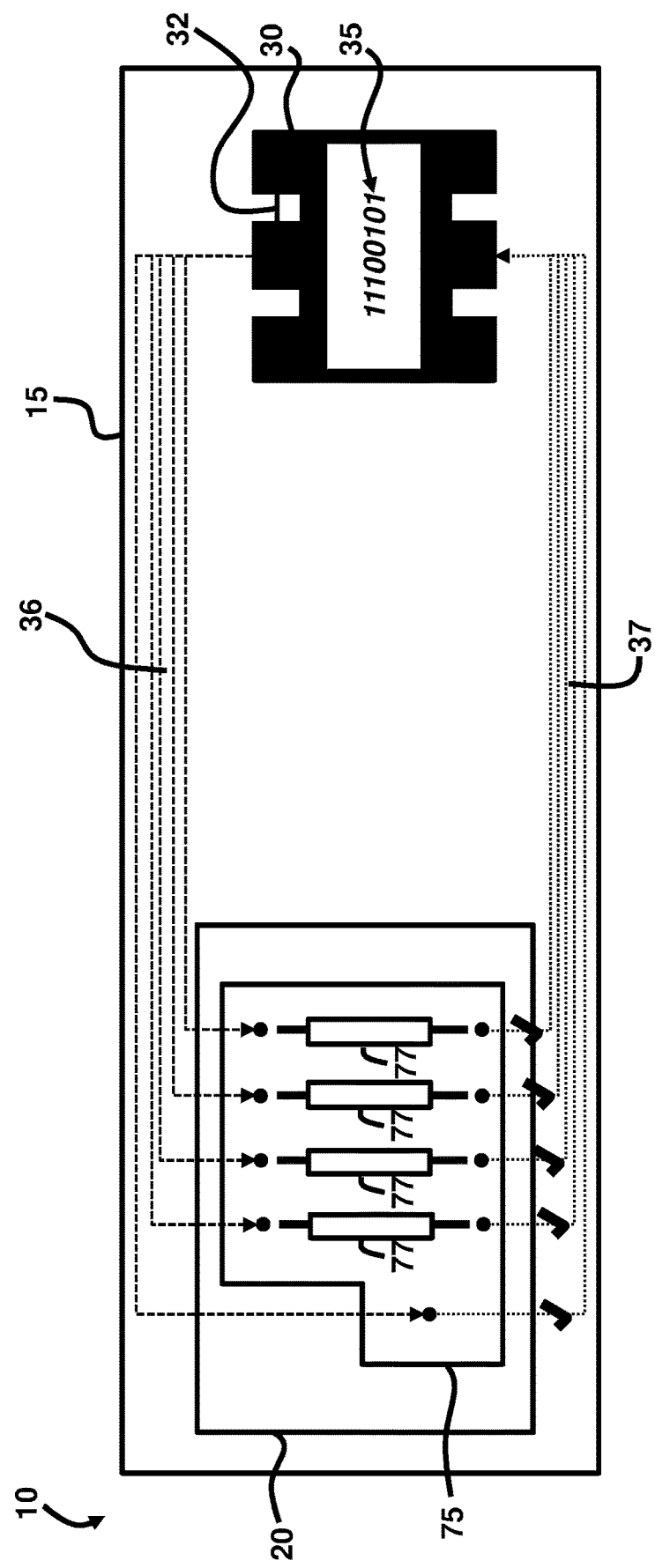

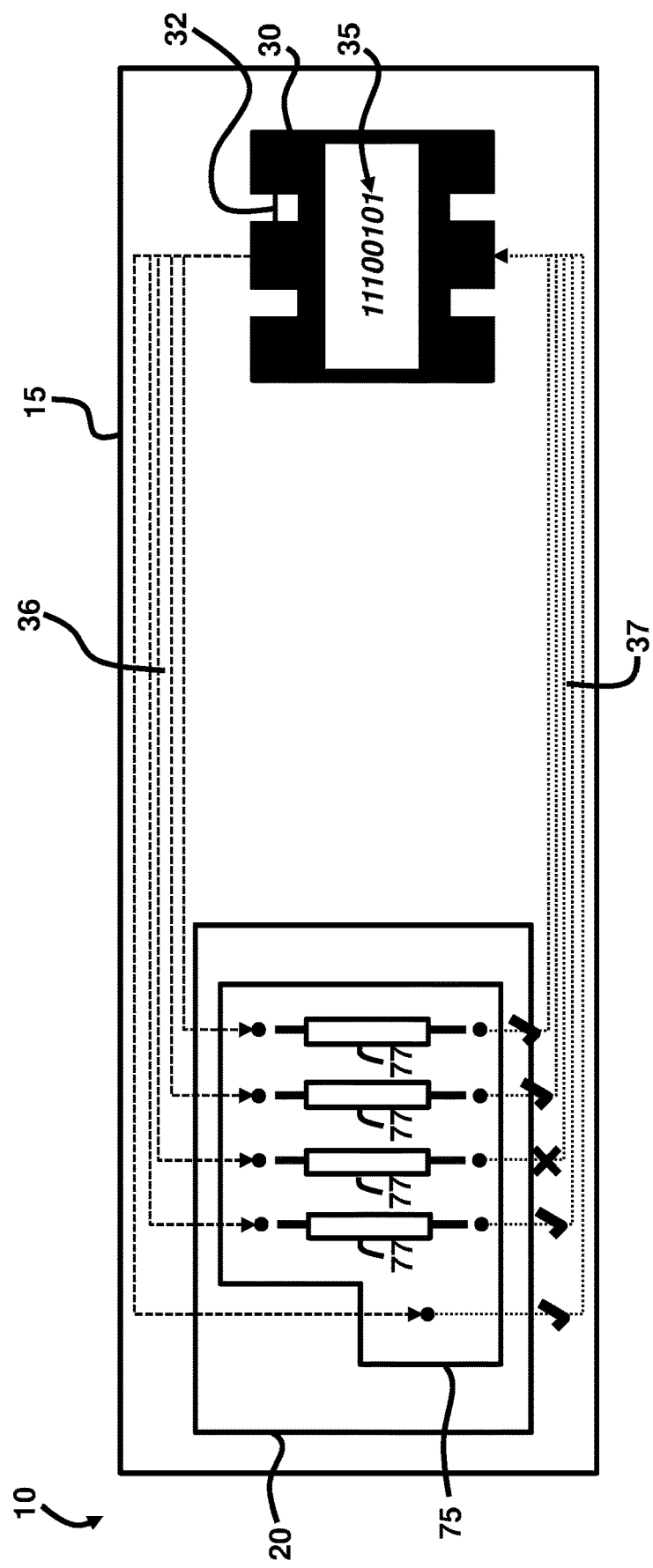

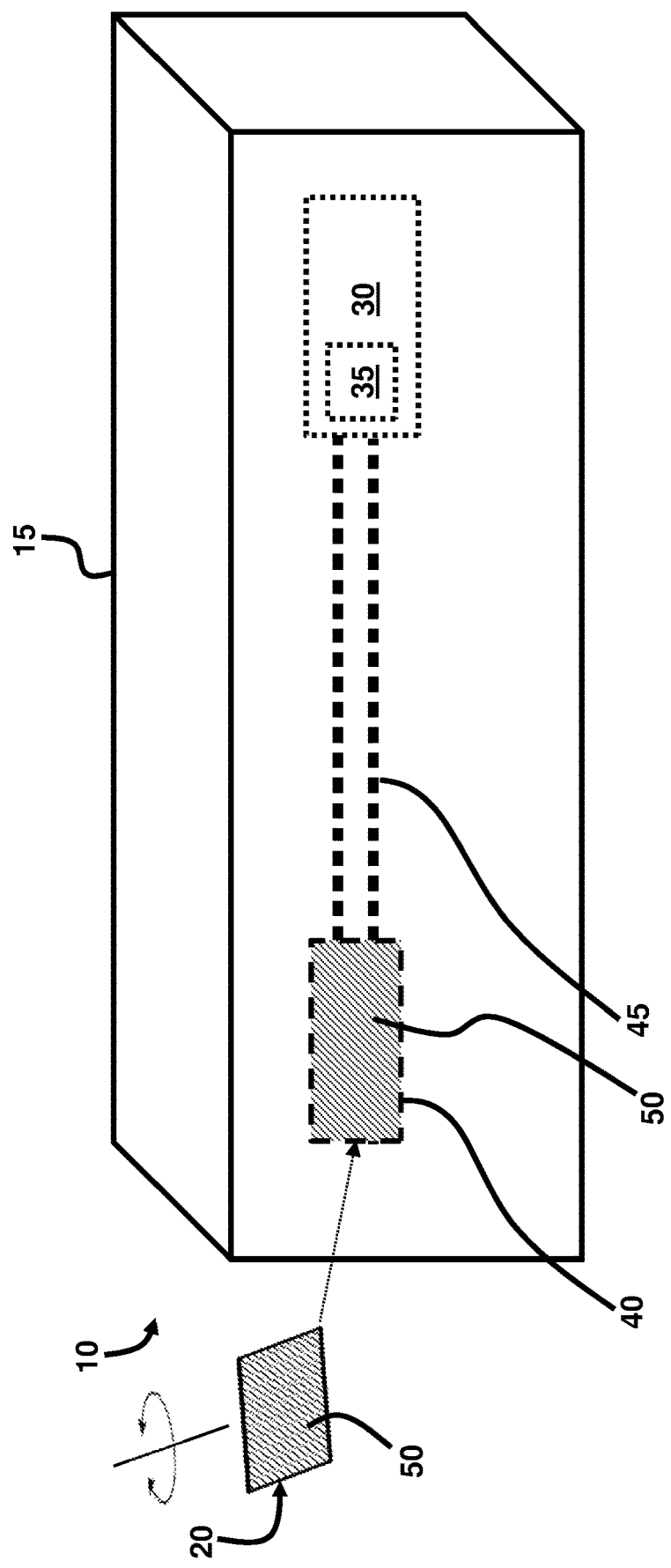

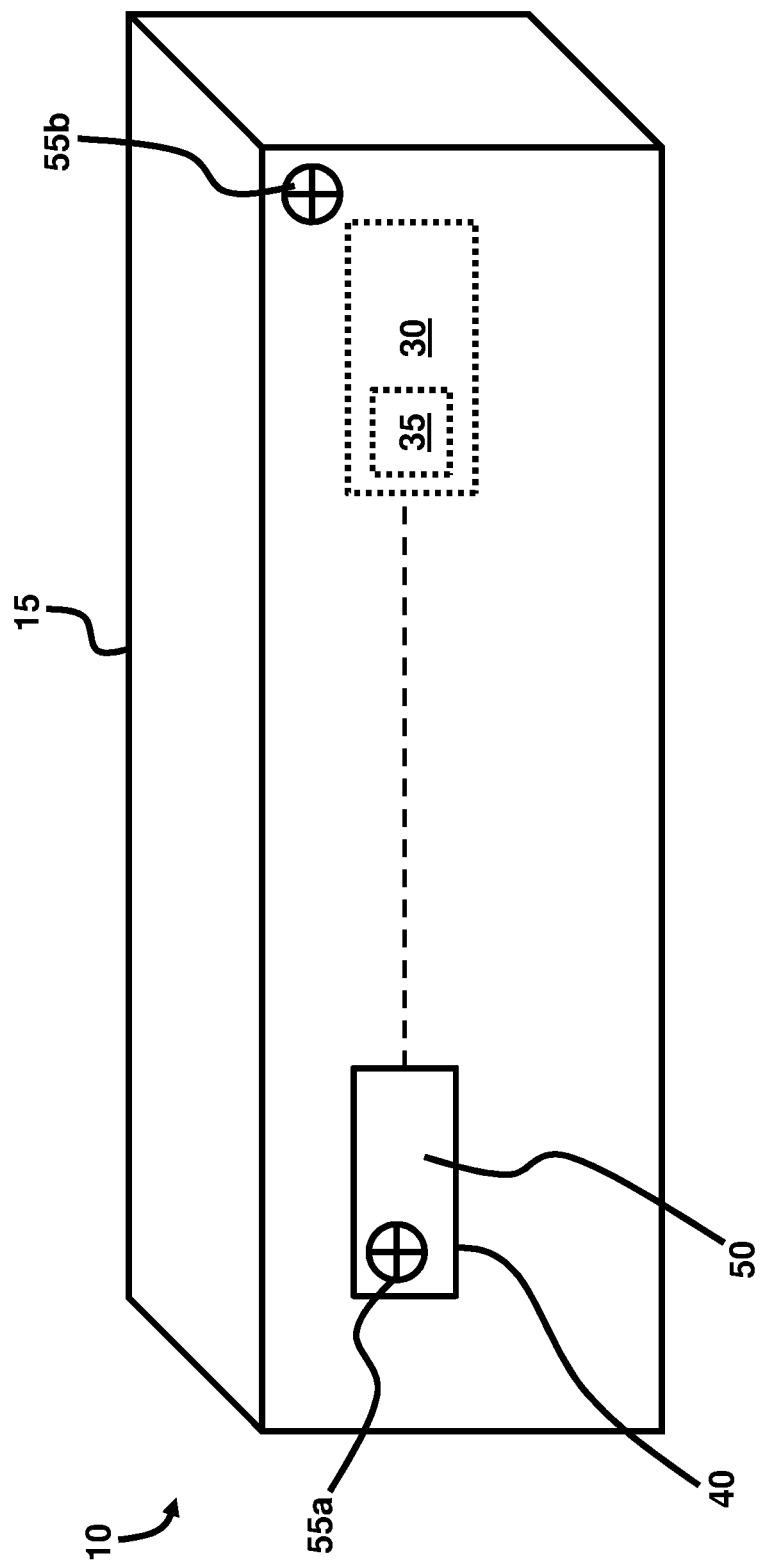

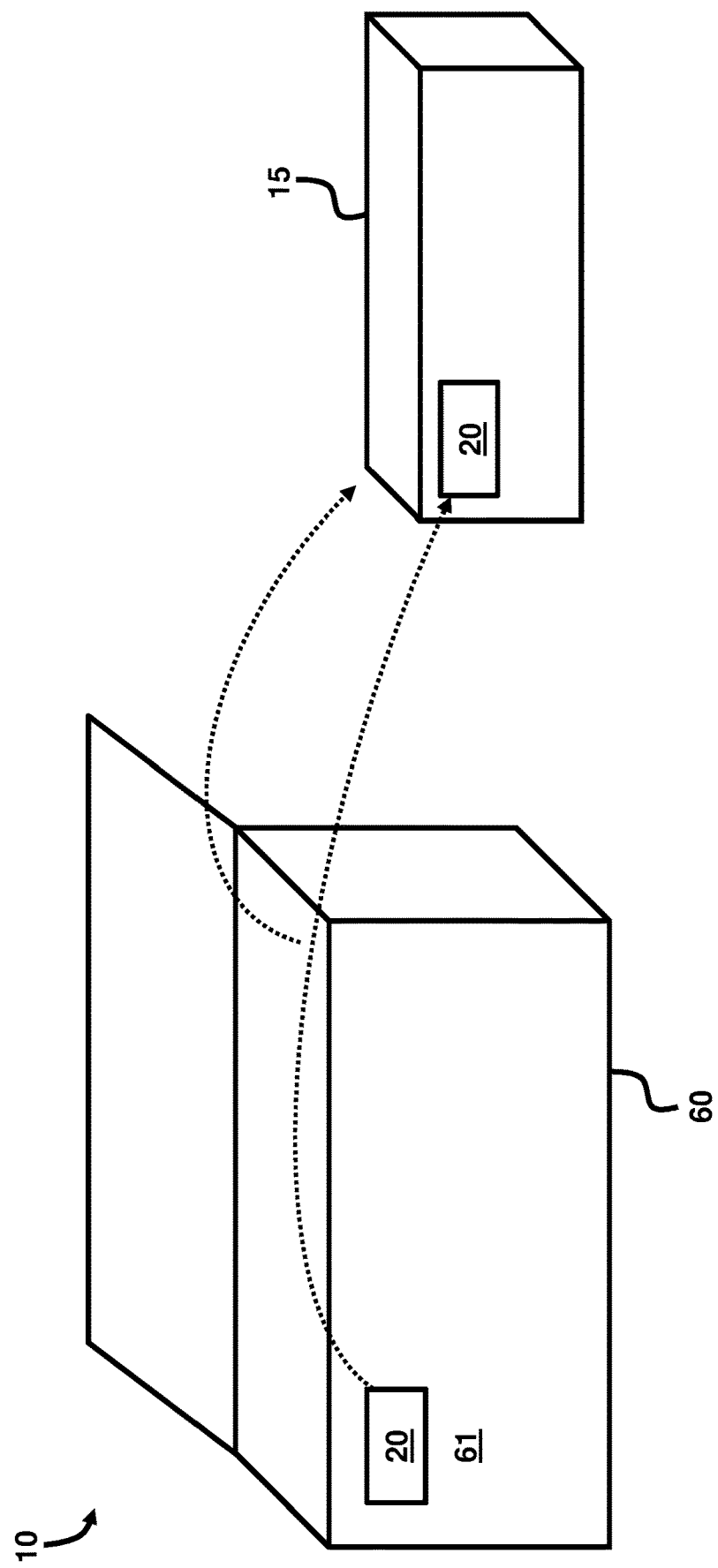

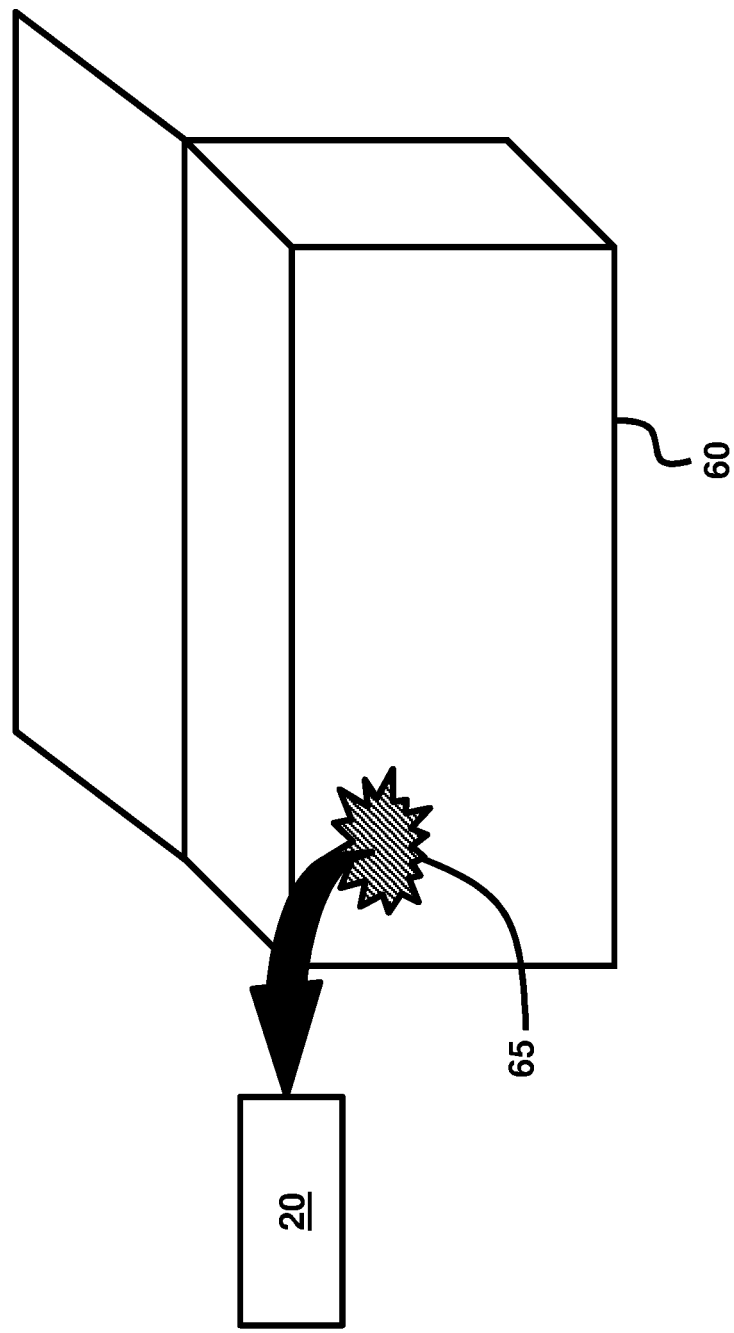

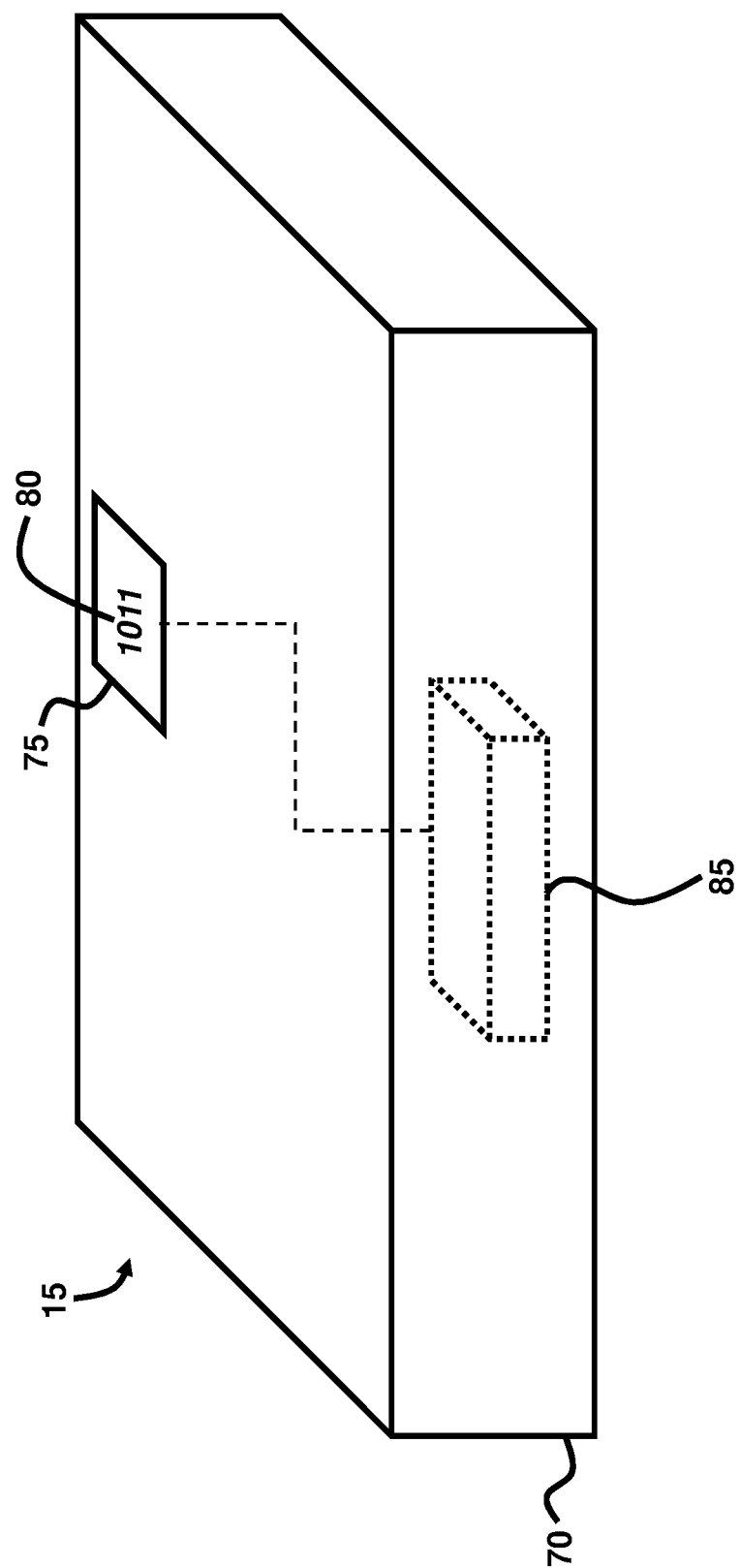

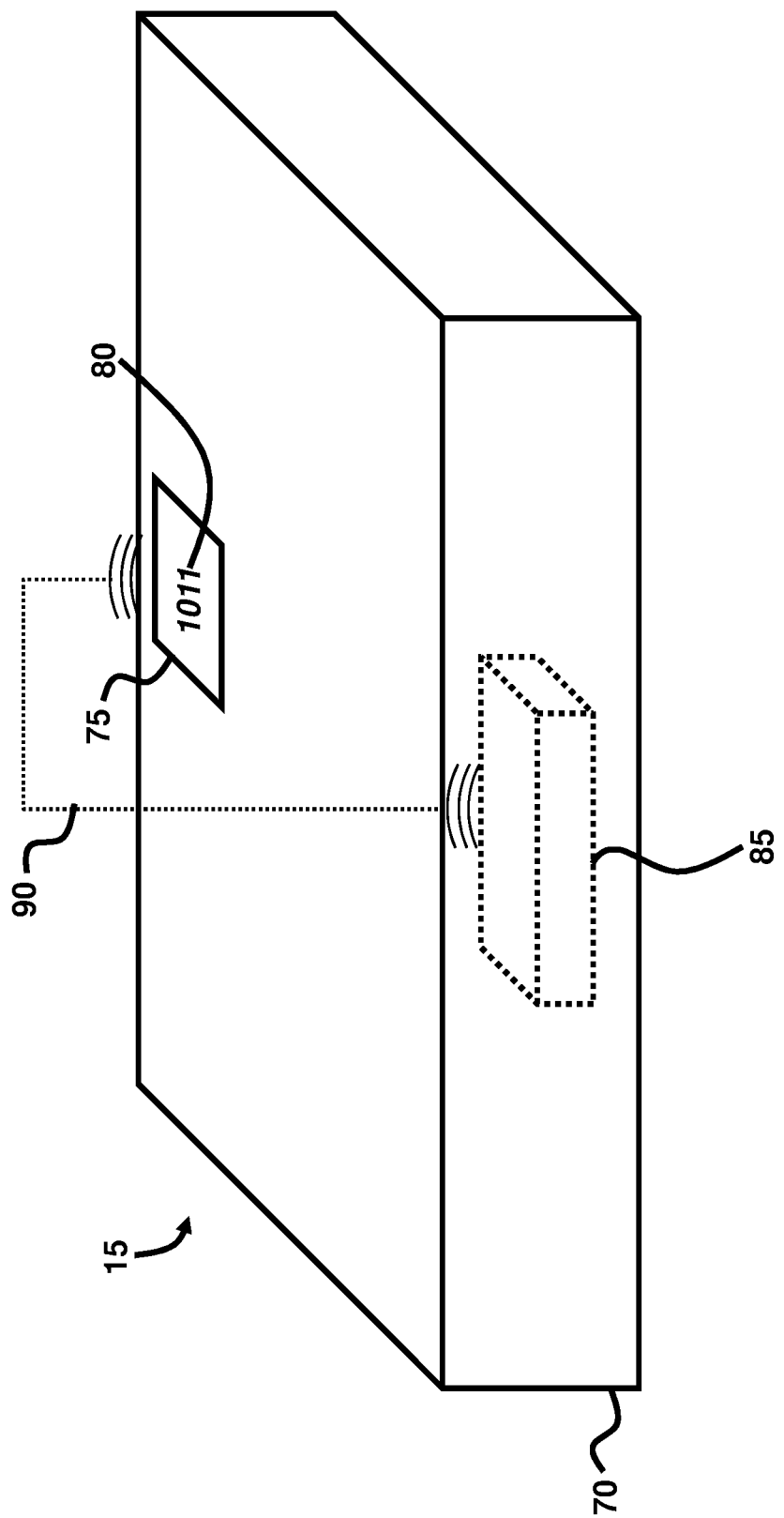

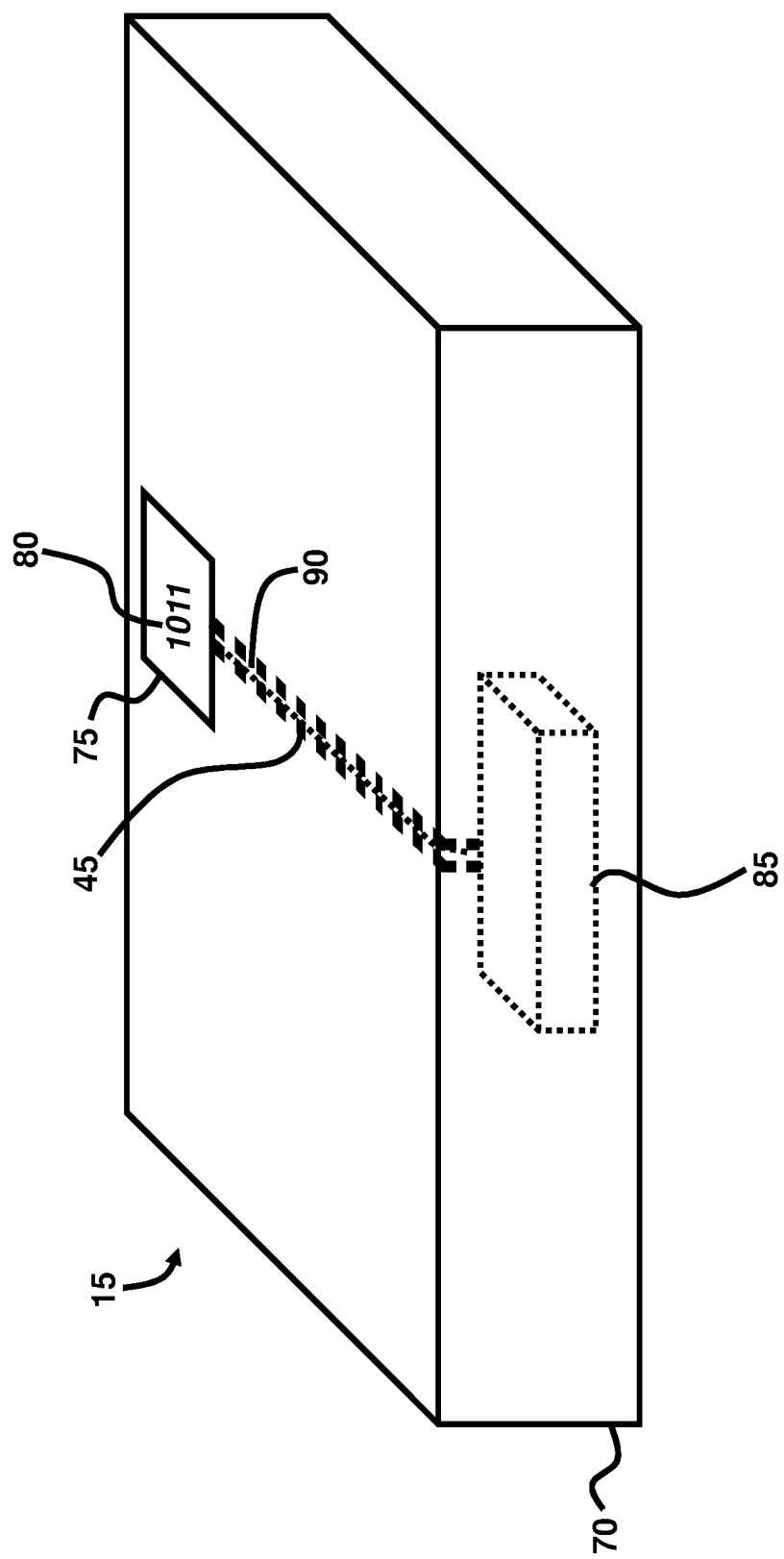

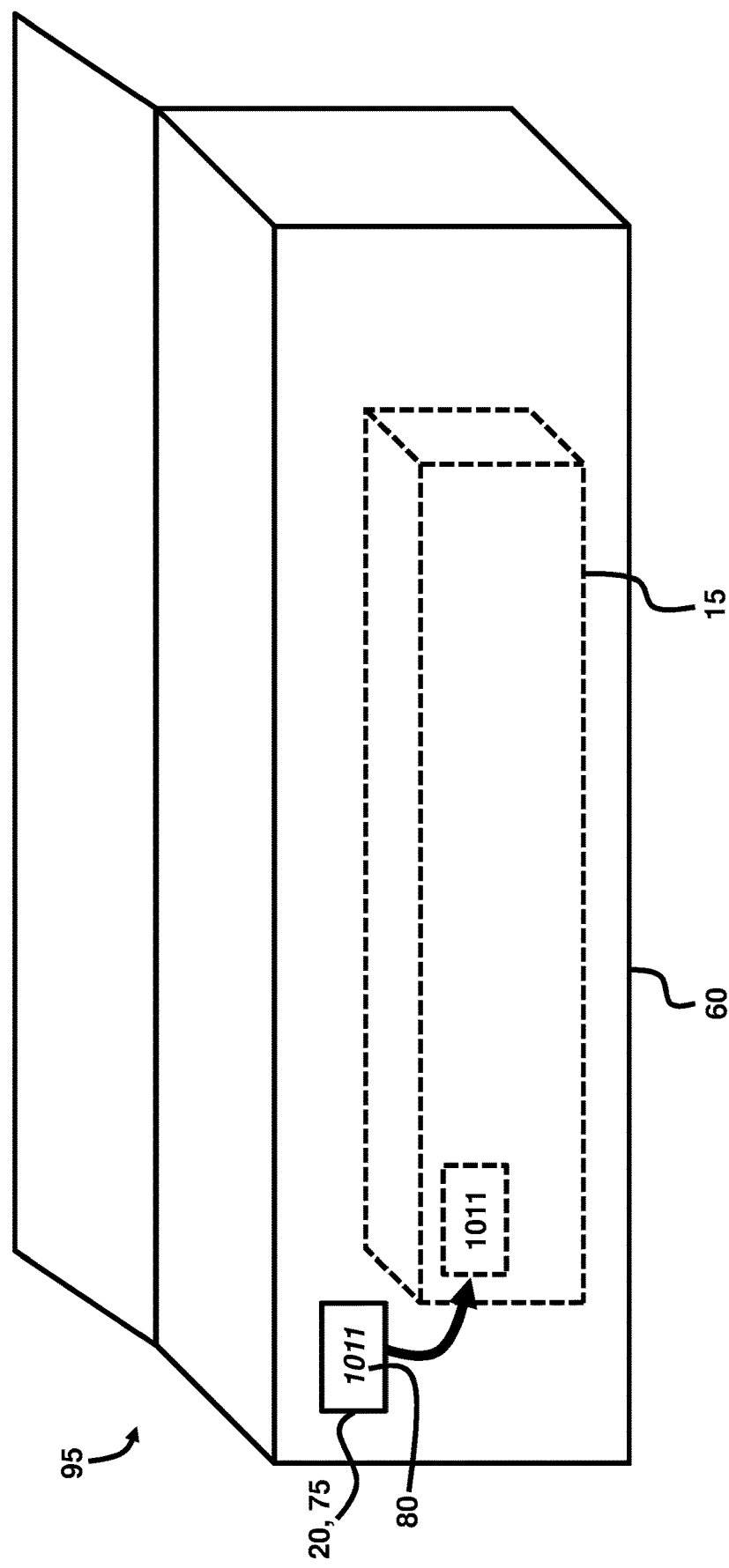

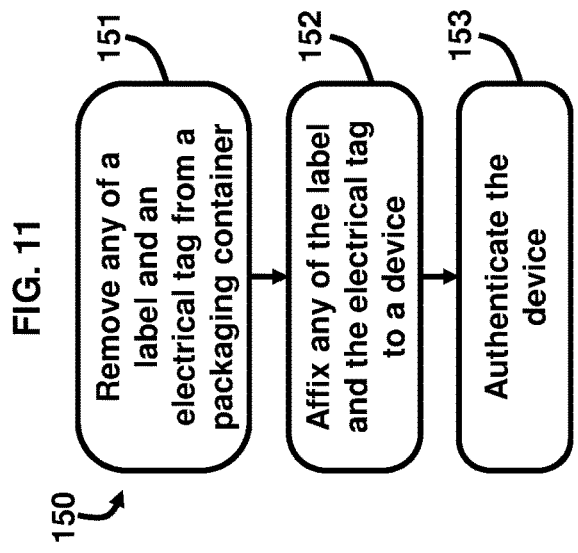
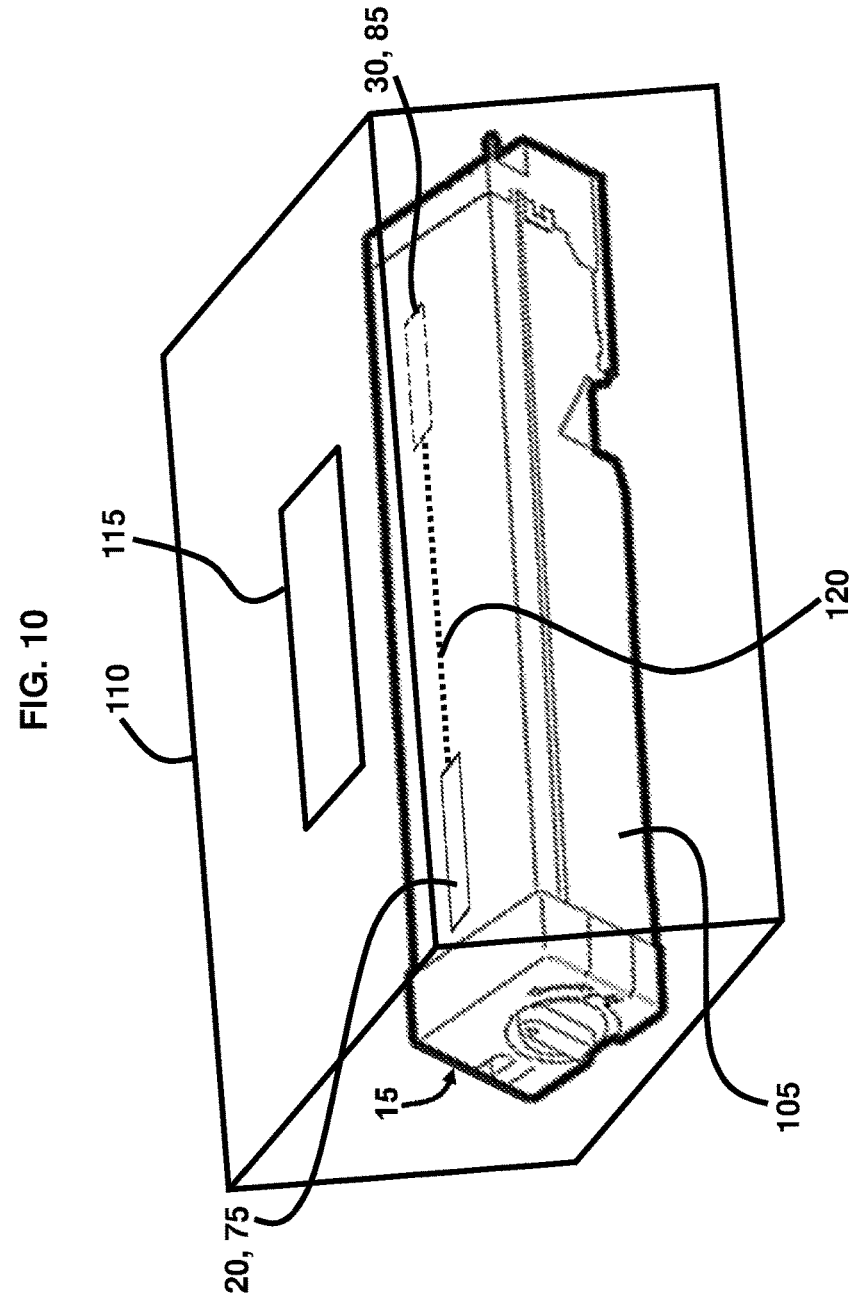

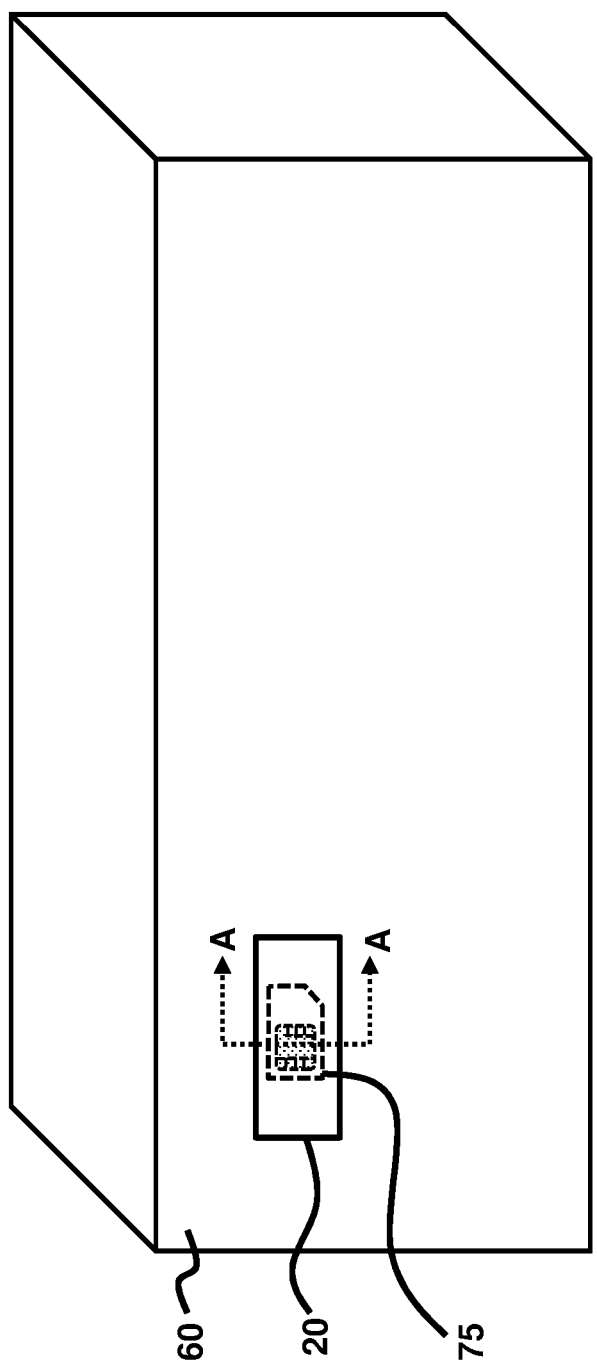

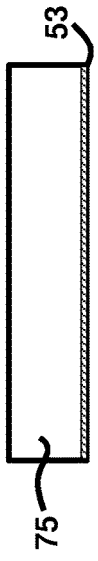
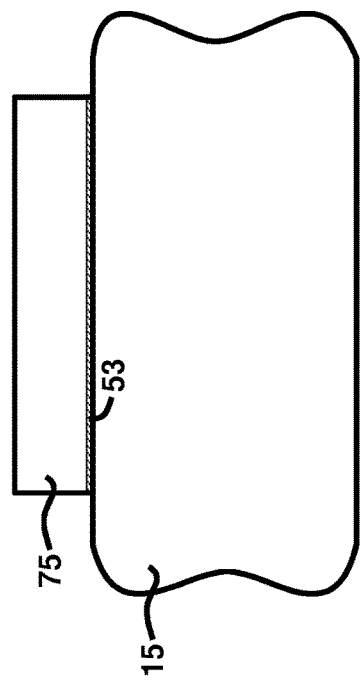
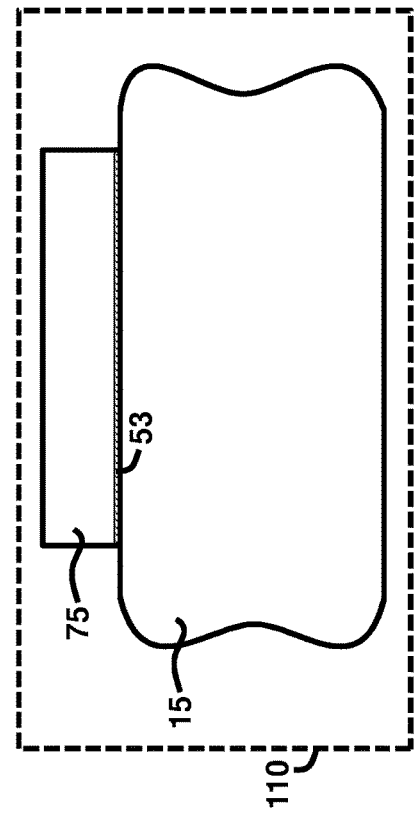
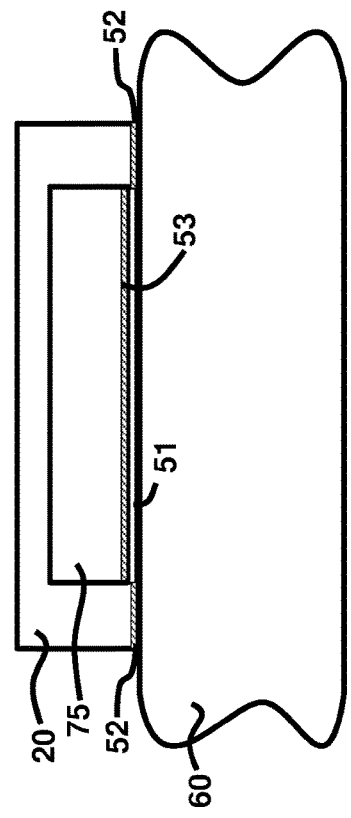
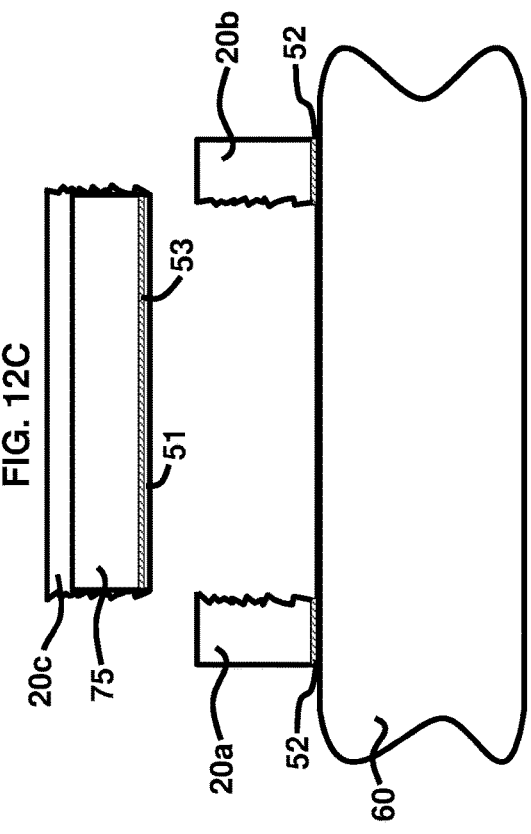

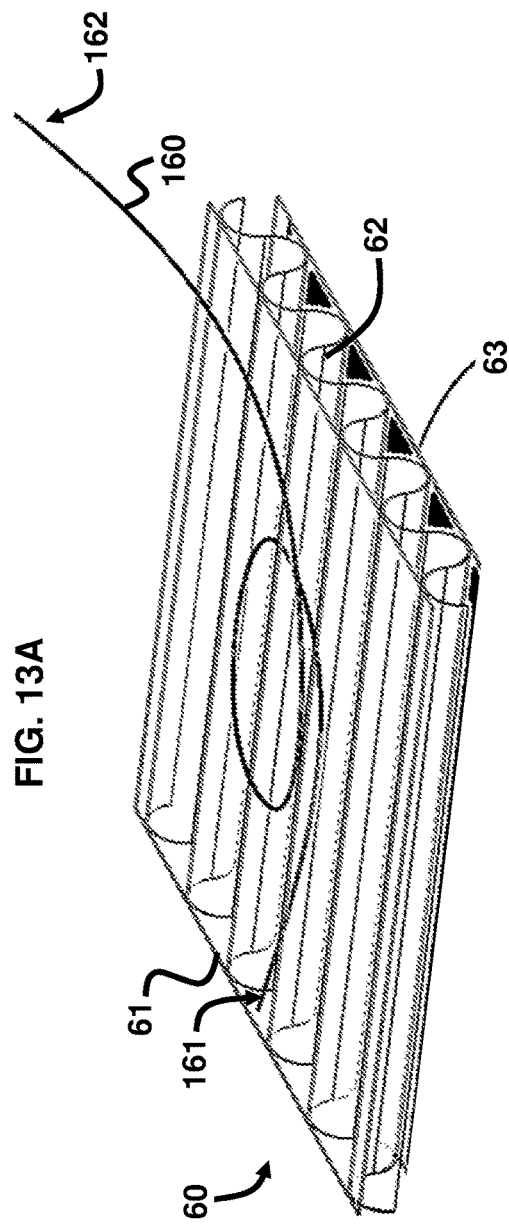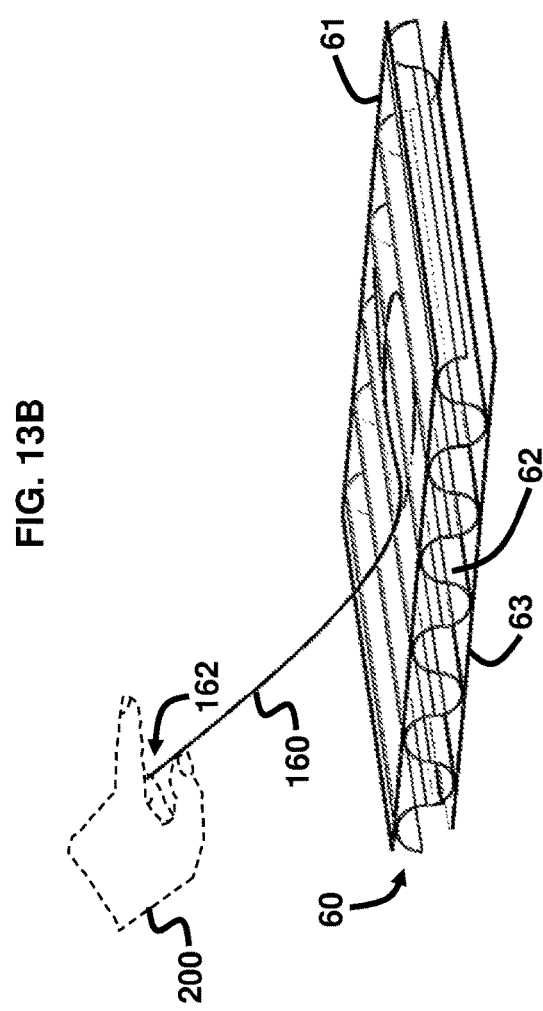
FIG. 13A
FIG. 13B

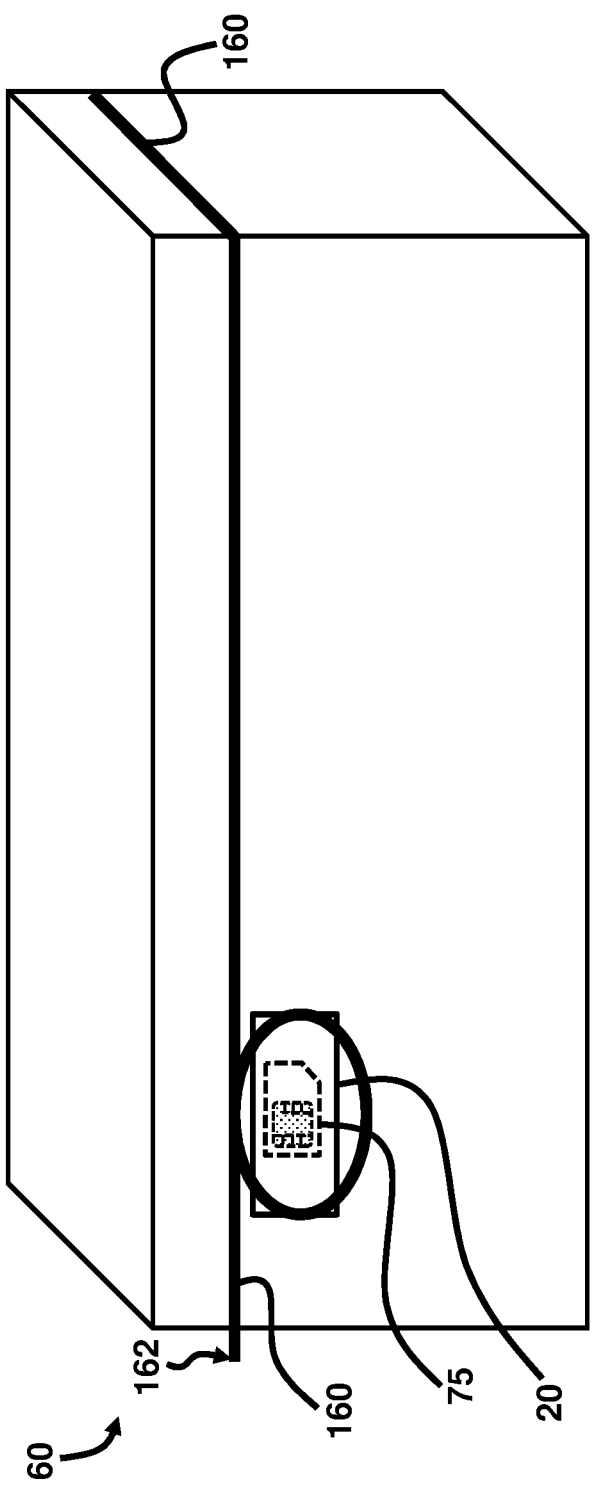

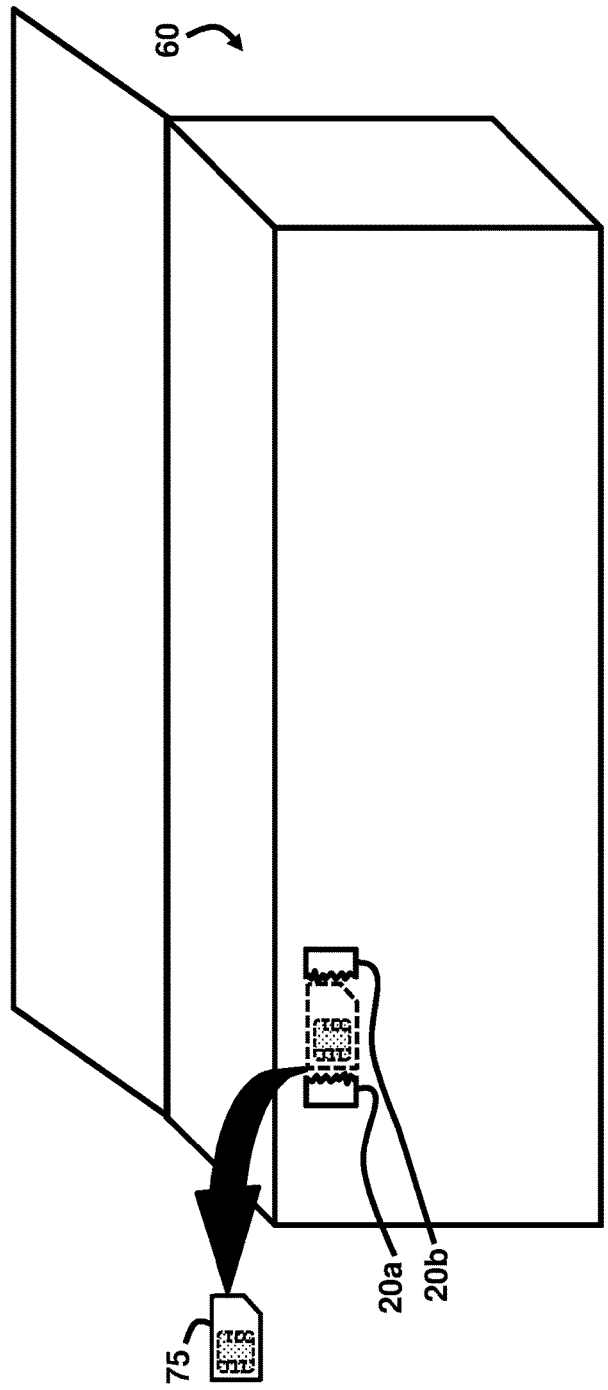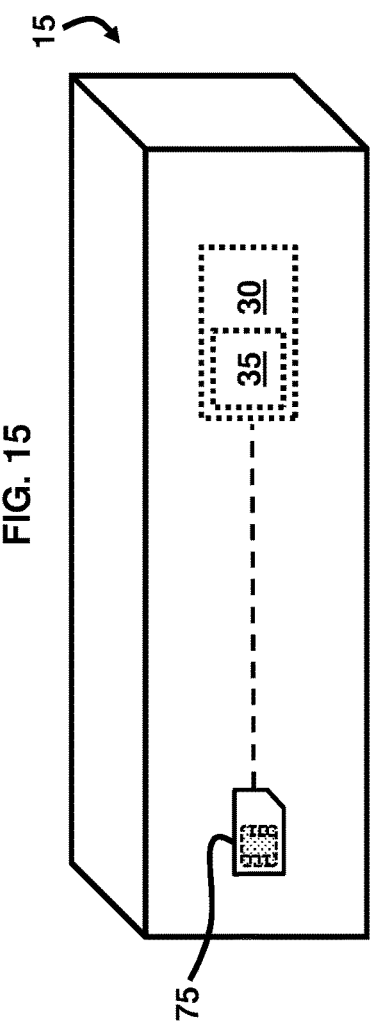

AUTHENTICATION OF DEVICES BY INDICATORS ON DEVICE PACKAGING

BACKGROUND

Original equipment manufacturer, OEM, products are sold in various forms of packaging. OEM packaging may display the OEM's branding. Consumers may purchase OEM products contained in the OEM packaging.

BRIEF DESCRIPTION OF THE DRAWINGS

FIG. 1 is a schematic diagram illustrating an assembly for authenticating a device, according to an example.

FIG. 2B is a schematic diagram illustrating a signal comparison process between a label and a device that results in authentication of the device, according to an example.

FIG. 2C is a schematic diagram illustrating a signal comparison process between a label and a device that results in non-authentication of the device, according to an example.

FIG. 4 is a schematic diagram illustrating attaching element on a label and/or a device, according to an example.

FIG. 5 is a schematic diagram illustrating an indicator on a label and/or a device, according to an example.

FIG. 6 is a schematic diagram illustrating a packaging container for a device, according to an example.

FIG. 7 is a schematic diagram illustrating a visually and/or structurally altered container after removal of a label, according to an example.

FIG. 8A is a schematic diagram illustrating a device with an authentication label, according to an example.

FIG. 8B is a schematic diagram illustrating the authentication label wirelessly connected to a circuit chip in a device, according to an example.

FIG. 8C is a schematic diagram illustrating the authentication label connected to a circuit chip in a device by electrical traces, according to an example.

FIG. 9A is a schematic diagram illustrating a packaging container apparatus, according to an example.

FIG. 10 is a schematic diagram illustrating a print cartridge with an authentication label, according to an example.

FIG. 11 is a flow diagram illustrating a method of authenticating a device, according to an example.

FIG. 12A is a schematic diagram illustrating a perspective view of a label and electronic tag attached to a packaging container, according to an example.

FIG. 12B is a schematic diagram illustrating a cross-sectional view of a label and electronic tag with respect to a packaging container, according to an example.

FIG. 12C is a schematic diagram illustrating a cross-sectional view of removal of a label and electronic tag from a packaging container, according to an example.

FIG. 12D is a schematic diagram illustrating a cross-sectional view of an electronic tag with an attaching element, according to an example.

FIG. 12E is a schematic diagram illustrating a cross-sectional view of an electronic tag attached to a device, according to an example.

FIG. 12F is a schematic diagram illustrating a cross-sectional view of an imaging device containing a device with an attached electronic tag, according to an example.

FIG. 13A is a schematic diagram illustrating a perspective cross-sectional view of a portion of a packaging container, according to an example.

FIG. 13B is a schematic diagram illustrating a perspective cross-sectional view of a portion of a packaging container with a user engaging a rip cord integrated with the packaging container, according to an example.

FIG. 14A is a schematic diagram illustrating a closed packaging container with an integrated rip cord, label, and electronic tag, according to an example.

FIG. 14B is a schematic diagram illustrating an opened packaging container after removal of the rip cord to release an electronic tag, according to an example.

FIG. 15 is a schematic diagram illustrating an electrical attached to a device, according to an example.

DETAILED DESCRIPTION

Figure 2A:
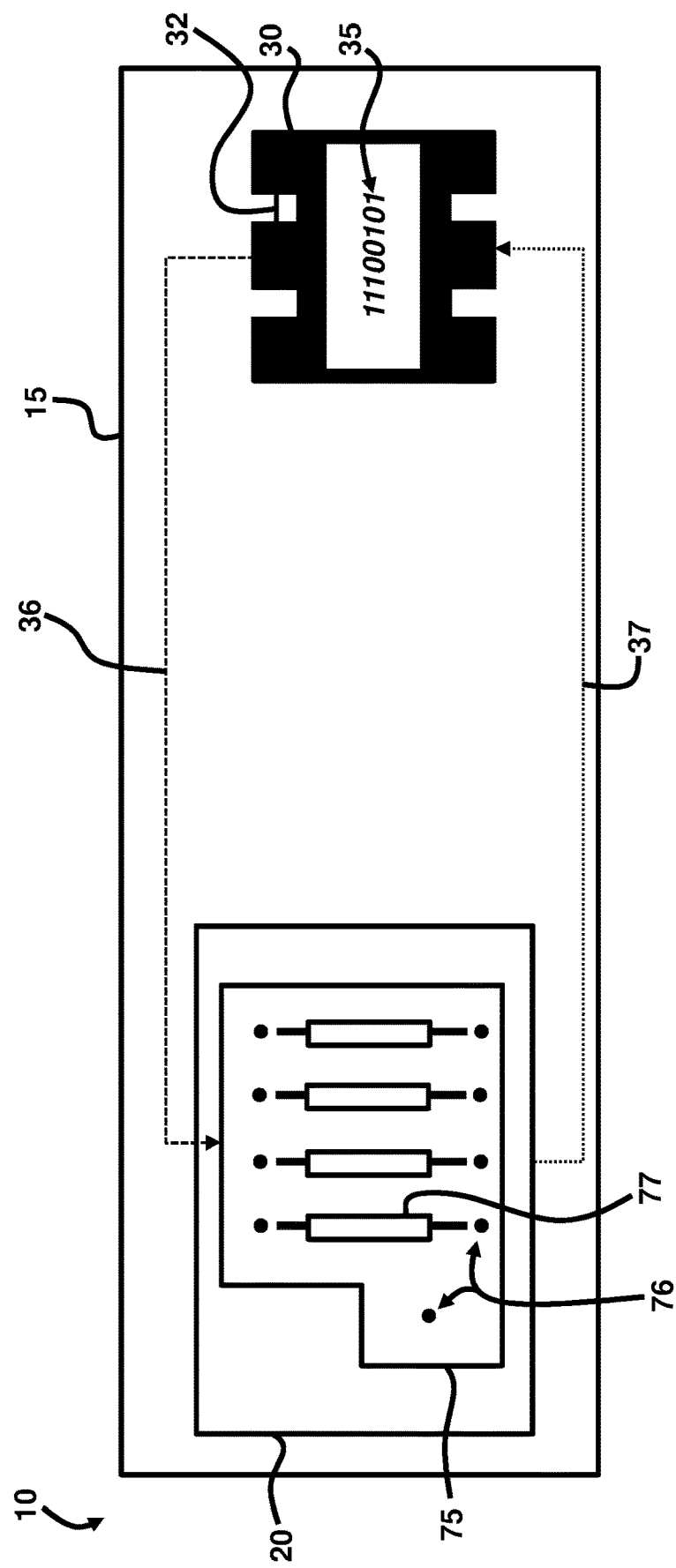
FIG. 2A is a schematic diagram illustrating signals being transmitted between an electronic tag of a label and a processing circuit of a device, according to an example.

OEM packaging containers may include bags, wraps, and boxes, among other types of packaging for housing various types of products sold or provided to consumers. The products may include a wide variety of goods including mechanical components, electronics, and devices, as well as other types of goods. Once the packaging container is opened and the product removed, the packaging container is often discarded, but not necessarily destroyed. Counterfeiters often take empty, yet usable packaging containers, and place counterfeit or remanufactured products inside to create the impression that the packaging container contains a genuine OEM product. Because the packaging container appears to be genuine, a purchaser or user of the product often has no way to know whether the product contained in the packaging container is a genuine OEM-supplied product or is a counterfeit product, and often the purchaser simply assumes the product is genuine since the packaging container is intact and has all of the markings, branding, and other identifiers of the OEM.

In order to address this, the examples described below provide techniques to authenticate genuine OEM products and to prevent product packaging container to be reused. An example provides a label on the packaging container, which is removable, and which is positioned on the product to (1) alter the packaging container to make the packaging container visually altered and/or physically damaged and thus unusable for subsequent packaging/re-use, and (2) authenticate that the product is sourced from the OEM. The label contains an electrical signature, which is readable by a processor, chip, or circuit in the product or in a device connected to the product and which provides an authentication signal as to whether the product is genuine based on the label originating from the OEM. If the authentication process reveals that the product does not match the label, or vice versa, then the product may be rendered unusable and either the product, a device connected to the product, or the label will issue an alert to the user that the product is not authenticated or validated as a genuine OEM product.

FIG. 1 is a schematic diagram illustrating an example assembly 10 comprising a device 15 and a label 20 attached to the device 15 and comprising an electrical signature 25. According to an example, the device 15 may be any type of electrical, mechanical, electro-mechanical, optical, or magnetic device and may contain internal sub-components, which may be electrical, mechanical, electro-mechanical, magnetic, optical, chemical, biological, pharmaceutical, agricultural, or any other type of component. According to various examples, the label 20 may be a sticker, tag, ticket, or any other type of marker and may contain any of fabric, plastic, paper, metal, gels, or any other material suitable for constructing the label 20. According to several examples, the electrical signature 25, which may contain secured digital key information, may be an electrical signal providing any type of electrical parameter such as resistance, capacitance, RC timing, inductance timing, series/parallel, power, amplitude, voltage, impedance, clock, gain, noise, jitter, distortion, frequency, or any other type of parameter associated with electronics and capable of being analyzed through signal processing techniques. While FIG. 1 illustrates the electrical signature 25 as comprising a series of binary digits, this is only an example, and the electrical signature 25 may take on any suitable form for displaying, portraying, characterizing, or describing an electrical parameter.

The assembly 10 comprises a processing circuit 30 coupled to the device 15 to compare the electrical signature 25 of the label 20 to a pre-programmed validation key 35 of the processing circuit 30. The processing circuit 30 may be any suitable processor that may store computer-readable instructions and is capable of reading and processing the electrical signature 25 of the label 20. In an example, the processing circuit 30 is embedded in the device 15. In other examples, the processing circuit 30 may be partially or completely positioned outside and on the device 15. In still other examples, the processing circuit 30 may be detachably coupled to the device 15. The pre-programmed validation key 35 may be a pre-set electrical code programmed into the processing circuit 30 or stored remotely and read by the processing circuit 30 through wired or wireless communication, wherein the pre-programmed validation key 35 comprises parameters associated with any type of electrical parameter such as described above with respect to the electrical signature 25 of the label 20, including resistance, capacitance, RC timing, inductance timing, series/parallel, power, amplitude, voltage, impedance, clock, gain, noise, jitter, distortion, frequency, or any other type of parameter associated with electronics and capable of being analyzed through signal processing techniques, according to various examples. The pre-programmed validation key 35 may take on any suitable form for displaying, portraying, characterizing, or describing an electrical parameter.

The processing circuit 30 is to authenticate a validity of the device 15 when the electrical signature 25 and the pre-programmed validation key 35 are harmonized. Accordingly, the harmonization may occur by cross-checking whether the electrical parameter associated with the electrical signature 25 matches or is otherwise in agreement with the electrical parameter associated with the pre-programmed validation key 35. As such, harmonization, within the context of the examples described herein, does not necessarily mean an actual match of parameter-to-parameter settings associated with the respective electrical signature 25 and pre-programmed validation key 35, but rather harmonization may indicate that the electrical signature 25 is verified by the pre-programmed validation key 35 as meeting a threshold requirement established by the pre-programmed validation key 35. For example, the electrical parameter may be a suitable range for an electrical parameter. In other examples, the electrical signature 25 may contain multiple electrical parameters that are to be harmonized with corresponding multiple electrical parameters of the pre-programmed validation key 35. As such, as shown in FIG. 2A, with reference to FIG. 1, the processing circuit 30 may contain a switch or other component 32 to render the device 15 enabled for operation once the authentication process is completed and the device 15 is deemed authenticated.

FIG. 2A, with reference to FIG. 1, is a schematic diagram illustrating signals 36, 37 being transmitted between an electronic tag 75 of the label 20 and a processing circuit 30 of the device 15, according to an example. The signals 36, 37 may comprise electrical signals, optical signals, magnetic signals, or other suitable transmission signal. The harmonization process between the label 20 and the device 15 may include a signal authentication process such that the signal or signals 37 containing the electrical signature 25 of the label 20 are compared, checked, and/or validated against the signal or signals 36 containing the pre-programmed validation key 35. The reverse process may occur also whereby the signal or signals 36 containing the pre-programmed validation key 35 are compared, checked, and/or validated against the signal or signals 37 containing the electrical signature 25 of the label 20. As such, either the electronic tag 75 or the processing circuit 30, or both, may perform the comparison of the signals 36, 37 to conduct the harmonization process. In an example, there may be multiple pre-programmed validation keys 35 and corresponding signals 36, which may be utilized for the authentication process. In another example, another component communicatively coupled to any of the electronic tag 75 and the processing circuit 30 may perform the comparison of the signals 36, 37 to conduct the harmonization process. Upon assessing that the signal 37 of the label 20 matches or is otherwise validated by the signal 36 of the processing circuit 30, the device 15 is deemed authenticated since the label 20 is considered to be associated with a genuine OEM source, and a such the device 15 is similarly considered to be associated with a genuine OEM source. Thereafter, the processing circuit 30 is to enable operation of the device 15 upon the authentication. In this regard, once the authentication process determines that the electrical signature 25 harmonizes with the pre-programmed validation key 35, the device 15 is deemed to be authenticated, and the device 15 is functionable for its intended purpose. In other examples, after the initial authentication process occurs, the device 15 may perform one or more future authentication processes to ensure that the label 20 has not been changed or tampered with. This may occur on a periodic basis, according to an example, to provide ongoing authentication and validation of the label 20 and device 15.

The electronic tag 75 may be a contact device, in one example, containing a contact element or elements 76 set to receive and transmit signals 36, 37. In another example, the electronic tag 75 may be a smart chip. Additionally, the electronic tag 75 may comprise any suitable device that is capable of transceiving signals 36, 37 with respect to the processing circuit 30. Moreover, the electronic tag 75 is not restricted to any particular configuration or number of contact elements 76. In an example, the electronic tag 75 may comprise a memory element or elements 77 to store the electrical signature 25. The electronic tag 75 may be embedded in the label 20 or it may be positioned on the surface 21 of the label 20. Additionally, the label 20 may comprise a layered structure such that the electronic tag 75 may be arranged in, on, or between any one of the layers of the label 20. The signals 36, 37 may be wireless signals or wired signals transceived through a physical communication medium, such as wires. Example arrangements in a wireless signal scenario include radio-frequency identification, near field communication, and Bluetooth® communication, as well as other communication transmission protocols.

The label 20 and electronic tag 75 may be an active device with its own power source such as a battery or solar cell, according to an example. In another example, the label 20 and electronic tag 75 may be a passive device without its own power source, and thus relying on another component, such as the device 15 or another component connected to the device 15, to provide power. When the device 15 is passive, it may not necessarily transmit any signals 37, and once electrical signature 25 stored in the electronic tag 75 is harmonized with the pre-programmed validation key 35 contained in the signal 36, the label 20 provides a visual indication that it is authenticated. In an example, the device 15 may be installed in a machine to provide power to any of the device 15 and the label 20. In an example, the electronic tag 75 may be disabled and non-usable once it has been authenticated once in order to prevent re-use on other devices, especially non-OEM devices.

FIG. 2B, with reference to FIGS. 1 and 2A, is a schematic diagram illustrating a signal comparison process between the label 20 and the device 15 by way of the processing circuit 30, which results in authentication of the device 15, according to an example. In one example, the processing circuit 30 transmits one or more signals 36 to the electronic tag 75. The signals 36 comprise the pre-programmed validation key 35 and are received by the electronic tag 75. Thereafter, the electronic tag 75 compares the pre-programmed validation key 35 against the electrical signature 25 stored in memory element(s) 77 to determine whether the electrical signature 25 is harmonized with the pre-programmed validation key 35. If there is harmonization between the electrical signature 25 and the pre-programmed validation key 35, then the signal 37 to the processing circuit 30 indicates that the authentication is valid, and that the label 20 is associated with a genuine OEM, and as such the device 15 is also validated. In an example, there may be multiple signals 36 containing multiple pre-programmed validation keys 35 input into the electronic tag 75 and each memory element 77 in the electronic tag 75 may store a different electrical signature 25, and accordingly there may be multiple comparisons made by the electronic tag 75 to determine whether harmonization of all the different electrical parameters is occurring. For example, the checkmarks in FIG. 2B depict a separate successful harmonization process occurring for each of the signals 36 being input into the electronic tag 75 resulting in multiple signals 37 being output by the electronic tag 75 indicating a valid label 20. In an example the multiple signals 37 may be consolidated as one signal before being input into the processing circuit 30. Once the processing circuit 30 receives the signal(s) 37 indicating a successful/valid harmonization process, the processing circuit 30 enables the device 15 to function according to its intended purpose by closing the switch 32 to allow the device 15 to operate. Again, the reverse process may occur whereby the direction of the signals 36, 37 to/from the electronic tag 75 and the processing circuit 30 are reversed to allow the harmonization process to occur in the processing circuit 30.

FIG. 2C, with reference to FIGS. 1 through 2B, is a schematic diagram illustrating a signal comparison process between the label 20 and the device 15 that results in non-authentication of the device 15, according to an example. In this example, the checkmarks in FIG. 2C similarly depict a separate harmonization processes occurring for each of the signals 36 being input into the electronic tag 75 resulting in multiple signals 37 being output by the electronic tag 75 indicating a valid label 20. However, one of the harmonization processes results in a mismatch or otherwise non-harmonization between one of the pre-programmed validation keys 35 being compared with one of the electrical signatures 25, which is depicted by the X-mark in FIG. 2C. Once the processing circuit 30 receives the signal(s) 37 indicating an overall unsuccessful/invalid harmonization process, the processing circuit 30 continues to keep the device 15 in a disabled state by keeping the switch 32 open thereby preventing the device 15 from operating in its intended purpose. Again, the reverse process may occur whereby the direction of the signals 36, 37 to/from the electronic tag 75 and the processing circuit 30 are reversed to allow the harmonization process to occur in the processing circuit 30.

Figure 3:
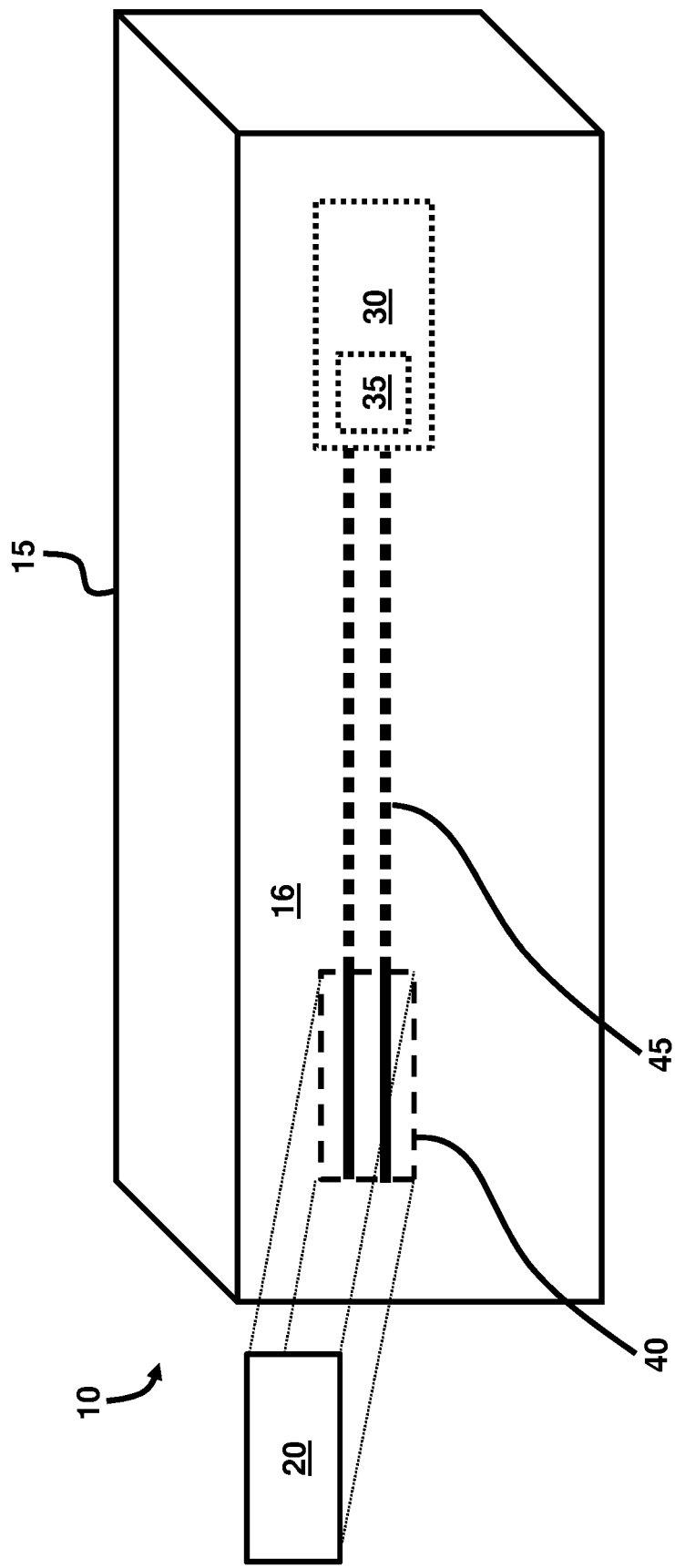
FIG. 3 is a schematic diagram illustrating an assembly containing a label to authenticate a device, according to an example.

FIG. 3, with reference to FIGS. 1 through 2C, is a schematic diagram illustrating the assembly 10, wherein the device 15 may comprise a contact region 40 upon which the label 20 is attached. The contact region 40 may be positioned in any suitable location of the device 15. The contact region 40 may be pre-labeled on the device 15 to allow a user to know where to place the label 20 for attachment. In an example, the label 20 becomes activated or otherwise communicatively coupled to the processing circuit 30 once the label 20 is attached to the contact region 40 on the device 15. The contact region 40 may be established by color-coding, alpha-numeric display, symbols, or any other technique to relay to the user where on the device 15 to attach the label 20. The contact region 40 may comprise electrical traces 45 connected to the processing circuit 30 to electrically connect the label 20 to the processing circuit 30. In this regard, the electrical traces 45 permit the label 20 to be operatively connected to the processing circuit 30, and thus electrically attached to the device 15. In an example, the device 15 is to directly or indirectly provide electrical power to the label 20. When the label 20 is a passive device without any self-power source, once the label 20 is attached to the contact region 40 and becomes electrically connected to the processing circuit 30, and thus to the device 15, power may be delivered to the label 20 through the electrical traces 45, which then activates the label 20. Accordingly, prior to becoming activated, the label 20 is dormant and does not receive or transmit any signals 36, 37. In an example, the electrical traces 45 may be completely or partially positioned in the device 15. In other examples, the electrical traces 45 are positioned on the device 15 and may be covered with any suitable cover to prevent the electrical traces 45 from becoming damaged or otherwise altered or manipulated. In another example, the electrical traces 45 may be exposed on the surface 16 of the device 15 in the contact region 40 and are covered by the label 20. The electronic tag 75 of the label comprises a suitable complementary electrical connector to establish an electrical connection with the traces 45.

FIG. 4, with reference to FIGS. 1 through 3, is a schematic diagram of the assembly 10 illustrating that an attaching element 50 may be applied to any of (i) the label 20 to attach to the device 15 and (ii) the device 15 to attach to the label 20. As such, either the label 20 contains an attaching element 50 or the device 15 contains an attaching element 50 in the contact region 40, or both the label 20 and the contact region 40 contain their own respective attaching element 50. According to various examples, the attaching element 50 may comprise an adhesive, a magnet, a Velcro® connector, or any other suitable component to permit the label 20 to attach to the device 15, and vice versa. In the view shown in FIG. 4, the label 20 is shown from its reverse side where the attaching element 50 is applied to the label 20.

As shown in the schematic diagram of FIG. 5, with reference to FIGS. 1 through 4, any of the label 20 and device 15 may comprise an indicator 55a, 55b to display an authentication status of the device 15. As such, either the label 20 may contain an indicator 55a or the device 15 may contain an indicator 55b or both the label 20 and the device 15 may contain an indicator 55a, 55b. The indicator 55a, 55b may comprise any type of mechanism that outputs any of an audio or visual signal to indicate whether the device 15 is authenticated. For example, the indicator 55a, 55b may comprise a speaker, a light-emitting diode, a color-transition element, or a combination of these, as well as any other suitable indicator. In an example, if the indicator 55a, 55b is a light-emitting diode, then a successful authentication process may result in a green light being displayed while an unsuccessful authentication process may result in a red light being displayed. In another example, if the indicator 55a, 55b is a speaker, then a successful authentication process may result in an audio output indicating that the device 15 is authenticated, whereas an unsuccessful authentication process may result in an audio output indicating that the device 15 is not authenticated. In yet another example, the label 20 may transition from one color to another color or display an alpha-numeric code or symbol to provide the output of the results of the authentication process. Various other suitable outputs may be provided by the indicator 55a, 55b in accordance with the examples herein. Furthermore, the indicator 55a, 55b may be positioned at any suitable location on any of the label 20 and device 15, respectively.

FIG. 6, with reference to FIGS. 1 through 5, is a schematic diagram illustrating the assembly 10 comprising a packaging container 60 to hold the device 15, wherein the label 20 is to be initially attached to the packaging container 60 and to be subsequently attached to the device 15. In an example, the device 15 may be initially stored in the packaging container 60. In an example, the label 20 is initially affixed to any suitable location on the surface 61 of the packaging container 60. A user may remove the device 15 from the packaging container 60 and remove the label 20 from the packaging container 60 and apply the label 20 to the device 15. In an example, the label 20 may be applied to the label 20 by way of the attaching element 50, as described above. Once the label 20 is attached to the device 15, the authorization process occurs, as described above. If the authorization is successful, then a user will know that the device 15 is OEM authenticated device since the label 20 was directly removed from the packaging container 60 and applied to the device 15. Moreover, because the OEM originally creates and applies the label 20 to the packaging container 60, the user knows that if the device 15 is authenticated, then that means the device 15 is similarly a genuine, OEM-supplied device 15, and not a counterfeit product.

As shown in the schematic diagram of FIG. 7, with reference to FIGS. 1 through 6, removal of the label 20 from the packaging container 60 renders the packaging container 60 any of visually and physically altered. In this context, removal of the label 20 may create an altered region 65 where the label 20 was initially attached to the packaging container 20. In various examples, the altered region 65 may comprise a hole, scratch, dent, or any other structural alteration of the packaging container 20. The altered region 65 results in a user being able to visually determine that the label 20 was removed and that the packaging container 20 has been used, and that the device 15 originally in the packaging container 20 has been used or otherwise accessed. Accordingly, the altered region 65 renders the packaging container 20 unsuitable for re-use or re-packaging without a user being alerted to the fact that the packaging container 60 was initially opened, and any device being stored in the packaging container 20 may not be an OEM-supplied device. In an example, the label 20 may be peelable for removal from the packaging container 60. However, the peeling process renders the packaging container 60 visually and/or physically altered and creates the altered region 65. In another example, the label 20 may have to be cut from the packaging container 60 thereby resulting in the altered region 65 being a partial or complete hole in the packaging container 60. Other processes may be possible for removing the label 20, and as such, the label 20 may be attached to the packaging container 60 in various ways. Irrespective of the manner in which the label 20 is attached to, and removed from the packaging container 60, the removal process creates the altered region 65 and otherwise renders the packaging container 60 visually and/or structurally altered and perhaps even completely destroyed.

FIG. 8A, with reference to FIGS. 1 through 7, is a schematic diagram showing another example of the device 15. In an example, the device 15 comprises a housing body 70, and an electronic tag 75 detachably connected to any suitable location of the housing body 70. Furthermore, the electronic tag 75 comprises an electrical code 80. The electrical code 80 may be similar to the electric signature 25, as described above. As shown in FIG. 8A, the electrical code 80 is shown as a binary number, however other suitable electrical codes are possible according to other examples, and as described above with reference to the electrical signature 25. The electronic tag 75 may be part of a label, such as label 20, as described above, or it may be a separate component from the label 20. The electronic tag 70 may be a passive or active component becoming activated once it is attached to the housing body 70 of the device 15.

The housing body 70 may take any suitable form depending on the device 15. Moreover, the housing body 70 may be set to be initially stored or provided in the packaging container 60 of FIG. 7, according to one example. Similarly, the electronic tag 75 may originally have been attached to the packaging container 60 of FIG. 7, and in the example shown in FIG. 8A, the electronic tag 75 is attached to the housing body 70 of the device 15. A circuit chip 85 is provided in the housing body 70, in an example, and is communicatively linked to the electronic tag 75. The circuit chip 85 may be any suitable processor that may store computer-readable instructions and is able to read and process the electrical code 80 of the electronic tag 75. According to an example, the circuit chip 85 may be similar to the processing circuit 30, as described above. The circuit chip 85 is set to read the electrical code 80 of the electronic tag 75, and authenticate the housing body 70 as being an original equipment manufacturer component when the electrical code 80 is accepted by the circuit chip 85. The acceptance by the circuit chip 85 may be similar to the authentication process, as described above with respect to the processing circuit 30 and label 20.

FIG. 8B, with reference to FIGS. 1 through 8A, illustrates that the electronic tag 75 and the circuit chip 85 may be wirelessly connected to each other. In this context, the transmission and reception of signals 90 between the electronic tag 75 and the circuit chip 85 does not require a physical medium. In a wireless arrangement, the electronic tag 75 is not restricted to be attached to any particular area or contact region so long as wireless communication may occur between the electronic tag 75 and the circuit chip 85. The electronic tag 75 may become activated once a wireless connection is established with the circuit chip 85 or once the electronic tag 75 is activated in some other manner, such as selecting a switch, pressing the electronic tag 75, etc.

FIG. 8C, with reference to FIGS. 1 through 8B, illustrates that the device 15 may comprise electrical traces 45 on or in the housing body 70, thereby electrically connecting the electronic tag 75 to the circuit chip 85. In this arrangement, the signals 90 may be transmitted between the electronic tag 75 and the circuit chip 85 through the electrical traces 45. Furthermore, the electrical traces 45 may allow the device 15 to provide power to the electronic tag 75. In various examples, the electrical traces 45 may be partially or completely embedded in the housing body 70.

FIG. 9A, with reference to FIGS. 1 through 8C, is a schematic diagram illustrating an example of an apparatus 95 comprising a packaging container 60 and any of a label 20 and an electronic tag 75 detachably connected to the packaging container 60. The label 20 and/or electronic tag 75 comprises an electrical code 80 set for electrical authentication upon removal of any of the label 20 and the electronic tag 75 from the packaging container 60 and being affixed to a device 15 associated with the packaging container 60, wherein the electrical authentication is to validate the packaging container 60 and the device 15 as original equipment manufacturer components. The label 20, electronic tag 75, electrical code 80, and authentication process is similar to the corresponding features described above with respect to FIGS. 1 through 8C. The device 15 and packaging container 60 are set to originate from the OEM, or under the guidance of the OEM, and as such authentication of the device 15 allows a user to be assured that the device 15 is a genuine OEM product and not a counterfeit product. In an example, the label 20 and/or electronic tag 75 may be scalable and as such may be originally in a folded configuration on the packaging container 60 and then prior to being applied to the device 15 is unfolded and is affixed to the device 15 in the unfolded configuration. The reverse process may also occur whereby the label 20 and/or electronic tag 75 is originally in an unfolded configuration on the packaging container 60, and then is folded prior to being affixed to the device 15.

Figure 9B:
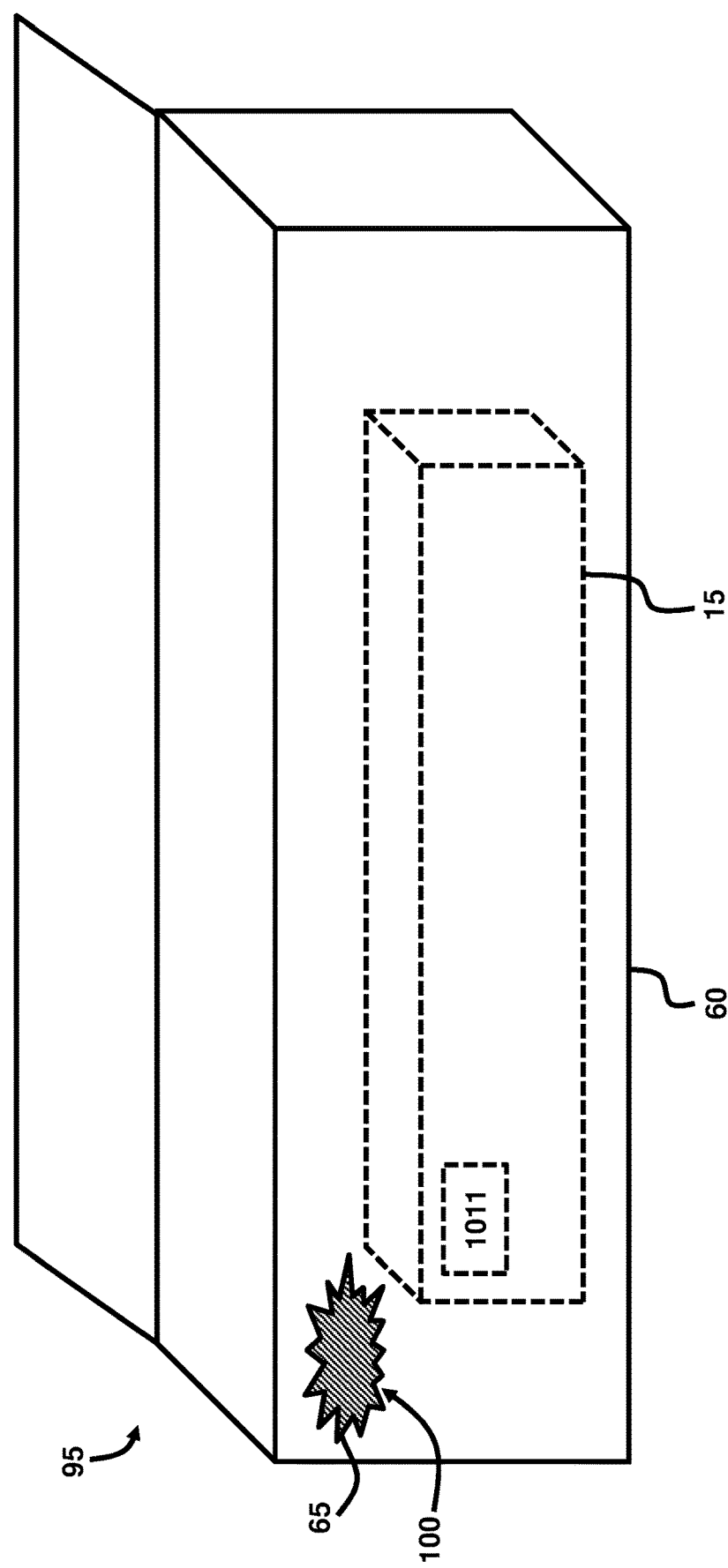
FIG. 9B is a schematic diagram illustrating a visually and/or structurally altered packaging container apparatus after removal of a label, according to an example.

The packaging container 60 is any of structurally and visually altered upon removal of any of the label 20 and electronic tag 75 from the packaging container 60, and as shown in the schematic diagram of FIG. 9B, with reference to FIGS. 1 through 9A, the packaging container 60 may comprise a visual indicator 65 in an area 100 where the label 20 and/or electronic tag 75 is removed to indicate an operational status of the packaging container 60. The label 20 and the device 15 may be electrically connected to one another upon affixing the label 20 to the device 15, in a manner as described above. Similarly, the electronic tag 75 and the device 15 may be electrically connected to one another upon affixing the electronic tag 75 to the device 15, in a manner as described above. In an example, the visual indicator 65 may comprise any of a partial or complete hole in the packaging container 60 or any other structural alteration of the packaging container 60. In another example, the visual indicator 65 may include the word VOID to indicate that the packaging container 60 is no longer to be re-used and any re-use will alert a user that the packaging container 60 is being re-used and as such any device 15 contained in the packaging container 60 may not necessarily be an OEM-supplied device. In still another example, the visual indicator 65 may be color-coded or coded with some other identifier signifying that the label 20 and/or electronic tag 75 has been removed from the packaging container 60. Once the label 20 and/or electronic tag 75 is removed from the packaging container 60, the packaging container 60 is rendered physically and/or visually altered, and accordingly a user will know that any attempt to re-use the packaging container 60 with a device 15 containing a label 20 and/or electronic tag 75 or not containing any label 20 and/or electronic tag 75 is a possible attempt to repackage a counterfeit product. Because the visual indicator 65 sufficiently alters the physical integrity of the packaging container 60, any attempt to place a new label 20 on the packaging container 60 will not cure the structural deficiencies of the packaging container 60 resulting from the original removal of the label 20 and/or electronic tag 75 therefrom. Furthermore, the label 20 and/or electronic tag 75 may contain specific features that prevents its re-use on the same or another packaging container 60 including complex edges, specific tears/cuts, strong adhesives, composite adhesives, laminate separation, heat markers, solvent markers, and electrical elements that fail under heightened stress/strain, and an attempted removal of the label 20 and/or electronic tag 75 from the device 15 after authentication would cause such a heightened stress/strain on the label 20 and/or electronic tag 75 thereby rendering its re-use impractical, if not impossible. In this regard, once the label 20 and/or electronic tag 75 is affixed to the device 15, it is intended to remain there for the life of the device 15, and further authentication of the device 15 is no longer required.

According to other examples, there may be multiple labels 20 and/or multiple electronic tags 75 present on the packaging container 60 and either all or some of the labels 20 and/or electronic tags 75 are to be placed on the device 15 for the authentication process. In such a scenario, once all labels 20 and/or electronic tags 75 are removed from the packaging container 60, only one of the labels 20 and/or electronic tags 75 contains a message underneath; e.g., on its back side, which is only readable upon removal of the label 20 and/or electronic tag 75 from the packaging container 60, and the message may indicate that that particular label 20 and/or particular electronic tag 75 is to be attached to the device 15. This permits even more physical damage and/or visual alteration of the packaging container 60 thereby enhancing the destruction of the packaging container 60 and further reducing the probability of re-use of the packaging container 60.

In an example, the device 15 may comprise a print cartridge 105, as illustrated in FIG. 10, with reference to FIGS. 1 through 9B. For example, the print cartridge 105 may be installed in an imaging machine 110, such as a printer, copier, scanner, fax machine, etc. Once the print cartridge 105 is installed, the imaging machine 110 may provide electrical power to print cartridge 105, which in turn provides electrical power to the label 20 and/or electronic tag 75. In an example, the imaging machine 110 comprises a control panel 115 to display the results of the authentication process. For example, instead of, or in addition to any of the label 20, electronic tag 75, and print cartridge 105 comprising an indicator, such as indicator 55a, 55b described above with reference to FIG. 5, the control panel 115 provides the same or similar functionality as does the indicator 55a, 55b in terms of the results of the device authentication process. In other examples, the indicator 55a, 55b may be on any part of the imaging machine 110.

The processing circuit 30 or circuit chip 85, which may be a read/writeable component, positioned on or in the print cartridge 105 may contain authentication information to validate or invalidate the label 20, and thus validate or invalidate the print cartridge 105 based on the input/output signals 120 sent between the label 20 and/or electronic tag 75 and the processing circuit 30 or circuit chip 85, respectively. If the label 20 and/or electronic tag 75 is not authenticated or the authentication process indicates an invalid label 20 and/or electronic tag 75, then the print cartridge 105 is rendered unworkable for example, by the processing circuit 30 or circuit chip 85 instructing the imaging machine 110 to not accept the functionality provided by the print cartridge 105. In an example, the imaging machine 110 is to read the processing circuit 30 or circuit chip 85 and provide information pertaining to the processing circuit 30 or circuit chip 85 on the control panel 115. In other examples, the processing circuit or circuit chip 85 may be read by a remotely-located mechanism, not shown, communicatively linked to the imaging machine 110. According to another example, the label 20 and/or electronic tag 75 may be re-writeable to permit re-programming and storage of the electrical signature 25 or electrical code 80 to permit re-use by the electronic tag 75, and thus re-use by the label 20 and/or electronic tag 75 on the device 15 for additional authentication, if desired by the OEM. In such an example, the re-programming may occur through firmware updates to the imaging machine 110, and is provided by the OEM or under its guidance, to ensure that any re-use of the label 20 and/or electronic tag 75 is acceptable by the OEM.

FIG. 11, with reference to FIGS. 1 through 10, is a flow diagram illustrating a method 150 of authenticating a device 15, according to an example. Block 151 describes removing any of a label 20 and electronic tag 75 from a packaging container 60. The removal of any of the label 20 and electronic tag 75 renders the packaging container 60 visually and/or structurally altered and perhaps destroyed. Block 152 describes affixing any of the label 20 and electronic tag 75 to a device 15. The device 15 is originally provided in the packaging container 60, and affixing any of the label 20 and the electronic tag 75 to the device 15 activates the label 20 and/or electronic tag 75 in terms of signal reception and transmission. Block 153 describes authenticating the device 15 based on a harmonization of the electrical signature 25 of any of the label 20 and electronic tag 75 and the pre-programmed validation key 35 associated with the device 15.

In an example, the electronic tag 75 may be embedded in the label 20 such that the label 20 is initially affixed to the packaging container 60, and the electronic tag 75 is removable from the label 20. Thereafter, the electronic tag 75 is affixed to the device 15 to perform the authentication and validation process with the processing circuit 30. Upon removal of the electronic tag 75 from the label 20, the label 20 is physically, structurally, and/or visually altered, and may be structurally destroyed so as to prevent re-use and/or reapplication of the label 20 on another packaging container, which may not necessarily be a OEM-genuine container. According to an example, the electronic tag 75 may comprise an electrical device comprising any of a memory device, a smart chip, a subscriber identity module card, an integrated circuit, and a flexible electrical circuit. In another example, any of the label 20 and the electronic tag 75 is embedded in the packaging container 60, and removal of any of the label 20 and the electronic tag 75 may structurally and/or visually alter any of the label 20 and the packaging container 60.

FIG. 12A, with reference to FIGS. 1 through 11, illustrates a schematic diagram of a label 20 containing an electronic tag 75 attached to a packaging container 60. The label 20 and electronic tag 75 may be initially attached to the packaging container 60 in such a way, as described below, to permit the electronic tag 75 to be safely removed from the packaging container 60 while destroying the label 20. This prevents subsequent re-use of the label 20 on other packaging containers and/or devices, which may be counterfeit and are not OEM-genuine packaging containers and/or devices.

FIGS. 12B through 12E, with reference to FIGS. 1 through 12A, illustrate cross-sectional views of an example of the label 20 and electronic tag 75 with respect to a portion of the packaging container 60, with the cross-sectional views of FIGS. 12B through 12E taken along line A-A of FIG. 12A. In FIG. 12B, a first attaching element 52 attaches the label 20 to the packaging container 60. In various examples, the first attaching element 52 may be provided under the label 20 adjacent to at least one side, or completely surrounding the area where the electronic tag 75 is embedded in the label 20, but the first attaching element 52 is not provided under the label 20 in the area where the electronic tag 75 is located. A second attaching element 53 is on the electronic tag 75. According to various examples, the first and second attaching elements 52, 53 may comprise an adhesive, a magnet, a Velcro® connector, or any other suitable component to permit attachment between components. A removable release layer 51 is positioned between the second attaching element 53 and the packaging container 60. In an example, the release layer 51 may contain a film or substance that contains a release agent such that the release layer 51 is attachable to the second attaching element 53, but upon removal of the release layer 51, does not remove or otherwise alter the second attaching element 53. Collectively, portions 20a, 20b, 20c constitute the entire label 20, according to the examples shown in FIGS. 12B and 12C.

In FIG. 12C, the portion 20c of the label 20 that is not attached to the packaging container 60 via the first attaching element 52 is removed from the packaging container 60. The release layer 51 that separates the second attaching element 53 from the packaging container 60 prevents the electronic tag 75 from being permanently attached to the packaging container 60. Thus, the electronic tag 75, which is embedded in the label 20, may be safely removed from the packaging container without structurally and/or functionally altering the electronic tag 75. However, the label 20 is structurally and/or visually altered and is otherwise destroyed as portions 20a, 20b of the label 20 remain attached to the packaging container 60 while a portion 20c of the label 20 containing the electronic tag 75 is detached from the packaging container 60.

As shown in FIG. 12D, the electronic tag 75 may be disengaged from the portion 20c of the label 20. As further shown in FIG. 12D, the release layer 51 is removed thereby exposing the second attaching element 53. Removal of the release layer 51 exposes the second attaching element 53 and allows the second attaching element 53 to affix the electronic tag 75 to the device 15, as depicted in FIG. 12E. Thereafter, as illustrated in the cross-sectional view of FIG. 12F, with reference to FIGS. 1 through 12E, the device 15, which contains the attached electronic tag 75, is installed into an imaging machine 110.

FIGS. 13A and 13B, with reference to FIGS. 1 through 12F, illustrate an example of a portion of the packaging container 60. In an example, the packaging container 60 may be a layered structure having a corrugated inner portion 62 sandwiched between the surface 61 and an underlying base layer 63. A rip cord 160 is provided that may be integrated with the packaging container 60. In an example, the rip cord 160 may be provided on any of the surface 61, the inner portion 62, and the base layer 63 of the packaging container 60, such that the rip cord 160 may be provided in a combination of the surface 61, inner portion 62, and the base layer 63 or the rip cord 160 may be restricted to one of the surface 61, inner portion 62, or the base layer 63 of the packaging container 60. The rip cord 160 may be a pull string that has a first end 161 integrated with the packaging container 60, and a second end 162 that is free or otherwise removable from the surface 61 of the packaging container 60 and which may be grabbed and pulled by a user 200. Pulling the rip cord 160 tears or otherwise structurally destroys the packaging container 60.

Figure 13D:
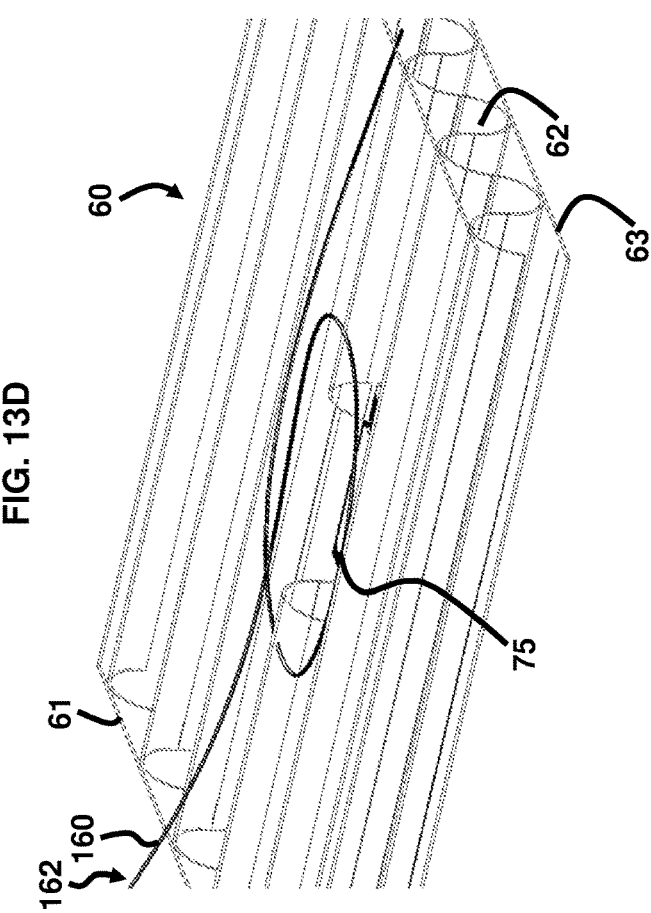
FIG. 13D is a schematic diagram illustrating a perspective cross-sectional view of a portion of a packaging container containing an integrated electronic tag and a rip cord, according to an example.
Figure 13C:
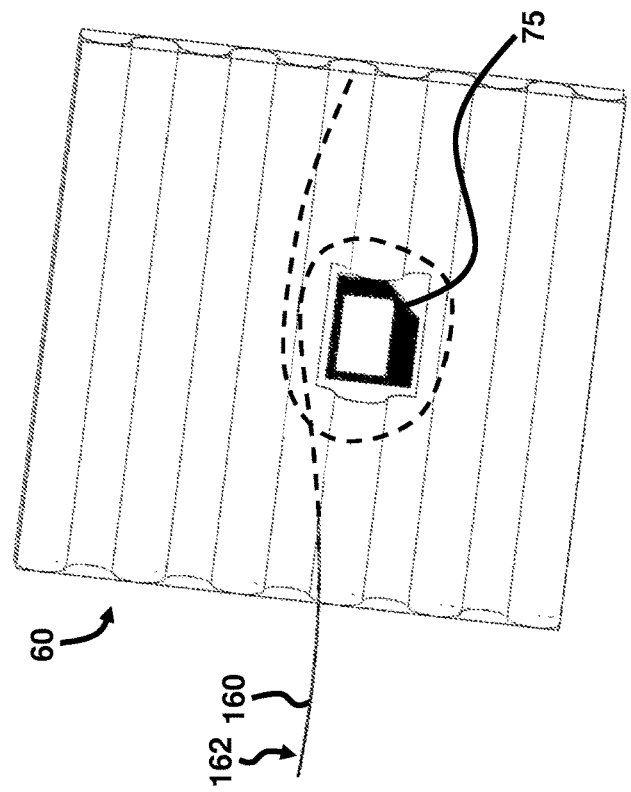
FIG. 13C is a schematic diagram illustrating a top cross-sectional view of a portion of a packaging container containing an integrated electronic tag and a rip cord, according to an example.

FIGS. 13C and 13D, with reference to FIGS. 1 through 13B, illustrate the electronic tag 75 embedded in the packaging container 60. The electronic tag 75 may be provided on any of the surface 61, the inner portion 62, and the base layer 62 of the packaging container 60, according to an example, wherein the electronic tag 75 is attached and/or integrated to the packaging container 60 in some manner. In the example shown in FIGS. 13C and 13D, the electronic tag 75 comprises any of a memory device, a smart chip, a subscriber identity module card, an integrated circuit, and a flexible electrical circuit, and in the examples of FIGS. 13C and 13D there may not necessarily be an associated label 20 with the electronic tag 75. However, a label 20 may be provided in conjunction with the electronic tag 75 as described earlier. The rip cord 160 is arranged to surround or otherwise encircle or loop around the electronic tag 75 such that pulling the rip cord 160 and disengaging the rip cord 160 from the packaging container 60 releases the electronic tag 75 from the packaging container 60.

FIGS. 14A and 14B, with reference to FIGS. 1 through 13D, illustrate the electronic tag 75 and rip cord 160 integrated with the packaging container 60 with the second end 162 of the rip cord 160 provided to be pulled thereby removing the rip cord 160 from the packaging container and thereby tearing or otherwise structurally and/or visually altering the packaging container 60. In an example, a label 20 may also be provided in conjunction with the electronic tag 75 such that the rip cord 160 encircles or otherwise surrounds at least a portion of the label 20 and completely encircles or otherwise surrounds the electronic tag 75. Accordingly, removal of the rip cord 160 releases any of the label 20 and the electronic tag 75 from the packaging container 60, and alters a structure of the packaging container 60. Moreover, removal of the rip cord 160 permanently alters, defaces, or otherwise destroys the structure of the packaging container 60 thereby rendering re-use of the packaging container 60 unpractical and unlikely without such re-use being readily apparent by a user 200. An altered packaging container 60 visually alerts the user 200 that any device 15 contained within such an altered packaging container 60 may be counterfeit and not an OEM-genuine device 15. In the example shown in FIG. 14B, when the rip cord 160 is being removed, the rip cord 160 may also remove part of the label 20 such that the portions 20a, 20b of the label 20 that are adhered to the packaging container 60 and are not confined by the encircling rip cord 160 remain affixed to the packaging container 60. In this example, the label 20 will no longer be re-usable for affixing to another packaging container 60, and the broken label 20 provides another visual alert for a user 200 that the packaging container 60 has been previously used. The electronic tag 75 is removed from the packaging container 60, and as shown in FIG. 15, with reference to FIGS. 1 through 14B, the electronic tag 75 is affixed to the device 15 and an electrical connection is established with the processing circuit 30 of the device 15 thereby permitting authentication and/or validation using the pre-programmed validation key 35, as described above. While not shown in FIG. 15, the label 20 or a portion thereof, may also be provided with the electronic tag 75 and affixed to the device 15.

Accordingly, the examples described herein disrupt re-boxing fraud by tying the product to the packaging container 60 in such a way that the packaging container 60 has a one-time use. By requiring a user to remove the label 20 from the packaging container 60, and thus essentially deface or destroy the packaging container 60, and to perform a one-time permanent authentication process, the value of the empty packaging container 60 is degraded. As such, the method 150 protects consumers and OEMs from having counterfeit, and potentially lower quality and/or unsafe products in the marketplace.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An assembly comprising:
   a device;
   a packaging container to hold the device;
   a label attached to the device and comprising an indicator including one or more of an audio device or a light-emitting device, and an electrical signature; and
   a processing circuit coupled to the device to:
      compare the electrical signature of the label to a pre-programmed validation key of the processing circuit;
      authenticate a validity of the device when the electrical signature and the pre-programmed validation key are harmonized; and
      enable operation of the device upon authentication,
   wherein the indicator outputs one or more of a visual indication or an audio indication upon authentication, and
   wherein the label is to be initially attached to the packaging container, to be removed from the packaging container, and to be subsequently attached to the device.

2. The assembly of claim 1, wherein the device comprises a contact region upon which the label is attached, the contact region comprising electrical traces connected to the processing circuit to electrically connect the label to the processing circuit.

3. The assembly of claim 1, wherein the device is to directly or indirectly provide electrical power to the label.

4. The assembly of claim 1, comprising an attaching element applied to any of:
   the label to attach to the device; and
   the device to attach to the label.

5. The assembly of claim 1, wherein the device comprises a second indicator to display an authentication status of the device.

6. The assembly of claim 1, wherein removal of the label from the container renders the container any of visually and physically altered.

7. A device comprising:
a housing body;
an electronic tag detachably connected to the housing body and comprising an indicator including one or more of an audio device or a light-emitting device, and an electrical code; and
a circuit chip in the housing body and communicatively linked to the electronic tag, the circuit chip to:
read the electrical code of the electronic tag; and
authenticate the housing body as being an original equipment manufacturer component when the electrical code is accepted by the circuit chip; and
cause the indicator to output one or more of a visual indication or an audio indication when the electrical code is accepted by the circuit chip.

8. The device of claim 7, wherein the electronic tag and the circuit chip are wirelessly connected to each other.

9. The device of claim 7, comprising electrical traces connecting the electronic tag to the circuit chip.

10. An apparatus comprising:
a packaging container; and
any of a label and an electronic tag detachably connected to the packaging container and comprising an indicator including one or more of an audio device or a light-emitting device, and an electrical code set for electrical authentication upon removal of any of the label and the electronic tag from the packaging container and being affixed to a device associated with the packaging container,
wherein the electrical authentication is to validate the packaging container and the device as original equipment manufacturer components, and to cause the indicator to output one or more of a visual indication or an audio indication when the electrical code is accepted by the circuit chip.

11. The apparatus of claim 10, wherein any of the label and the packaging container is any of structurally and visually altered upon removal of any of the label and electronic tag from the packaging container.

12. The apparatus of claim 10, wherein the indicator comprises a visual indicator in an area where any of the label and the electronic tag is removed to indicate an operational status of the packaging container.

13. The apparatus of claim 10, wherein the label and the device are electrically connected to one another upon affixing the label to the device.

14. The apparatus of claim 10, wherein the device comprises a print cartridge.

15. The apparatus of claim 10, wherein the electronic tag and the device are electrically connected to one another upon affixing the electronic tag to the device.

16. The apparatus of claim 10, wherein the electronic tag comprises any of a memory device, a smart chip, a subscriber identity module card, an integrated circuit, and a flexible electrical circuit.

17. The apparatus of claim 10, wherein the electronic tag is embedded in any of the label and the packaging container.

18. The apparatus of claim 17, comprising:
a first attaching element to attach the label to the packaging container;
a second attaching element on the electronic tag; and
a removable release layer between the second attaching element and the packaging container, wherein removal of the release layer allows the second attaching element to affix the electronic tag to the device.

19. The apparatus of claim 10, comprising a rip cord integrated with the packaging container and surrounding any of the label and the electronic tag, wherein removal of the rip cord releases any of the label and the electronic tag from the packaging container, and alters a structure of the packaging container.

* * * * *